United States Patent [19]

Goldman et al.

[11] Patent Number: 5,569,003
[45] Date of Patent: Oct. 29, 1996

[54] AUTOMATED ENGRAVING APPARATUS AND METHOD

[75] Inventors: Mark E. Goldman; Michel A. Aubert, both of San Rafael; Alexander M. Shenderovich, San Francisco; Jagat R. Acharya, Livermore, all of Calif.

[73] Assignee: Quick-Tag, Inc., Rancho Santa Fe, Calif.

[21] Appl. No.: 242,468

[22] Filed: May 13, 1994

[51] Int. Cl.$^6$ .......................... B43L 13/00; B65G 59/00; B65G 1/07; G05B 19/00

[52] U.S. Cl. .......................... 409/132; 33/18.2; 221/131; 221/124; 221/232; 358/299; 364/474.02; 364/474.22

[58] Field of Search .......................... 358/299; 221/123, 221/131, 133, 124, 232, 239; 364/474.02, 474.22, 479; 33/18.2; 312/61, 71; 409/132, 191

[56] References Cited

U.S. PATENT DOCUMENTS

| | | | |
|---|---|---|---|
| 458,325 | 8/1891 | Gifford . | |
| 481,983 | 9/1892 | Thom . | |
| 2,139,234 | 7/1936 | Johnson | 308/6 |
| 2,351,436 | 6/1944 | Ketz | 90/59 |
| 2,865,236 | 12/1958 | Parke | 77/33.5 |
| 3,088,729 | 5/1963 | Marcus | 269/97 |
| 3,343,553 | 9/1967 | Whitmore | 221/124 |
| 3,436,072 | 4/1969 | Svenson | 269/94 |
| 3,512,794 | 5/1970 | Lohman | 279/123 |
| 3,534,396 | 10/1970 | Hart et al. | 235/61.6 |
| 3,565,284 | 2/1971 | Hinterreiter | 221/232 |
| 3,634,662 | 1/1972 | Slawson | 235/151.11 |
| 3,668,653 | 6/1972 | Fair et al. | 340/172.5 |
| 3,783,741 | 1/1974 | Schadebrodt et al. | 90/13 C |
| 3,857,025 | 12/1974 | English et al. | 235/151.11 |
| 4,116,143 | 9/1978 | Manabe | 112/121.11 |
| 4,135,239 | 1/1979 | Hamill, III et al. | 364/107 |
| 4,198,038 | 4/1980 | Quinter | 269/137 |
| 4,199,814 | 4/1980 | Rapp et al. | 364/474 |
| 4,228,495 | 10/1980 | Bernhard et al. | 364/101 |
| 4,240,119 | 12/1980 | Norton et al. | 358/297 |
| 4,254,552 | 3/1981 | Samis | 33/18 R |
| 4,281,379 | 7/1981 | Austin | 364/102 |
| 4,314,330 | 2/1982 | Slawson | 364/192 |
| 4,328,448 | 5/1982 | Berenberg et al. | 318/561 |
| 4,328,550 | 5/1982 | Weber | 364/747 |
| 4,344,127 | 8/1982 | McDaniel et al. | 364/130 |
| 4,345,750 | 8/1982 | Glaser | 269/136 |
| 4,355,733 | 10/1982 | Schoenkopf et al. | 221/123 |
| 4,437,150 | 3/1984 | Dahlgren, Jr. et al. | 364/474 |
| 4,439,834 | 3/1984 | Dahlgren, Jr. et al. | 364/474 |
| 4,561,814 | 12/1985 | Dahlgren, Jr. et al. | 409/80 |
| 5,235,519 | 8/1993 | Miura | 364/479 |
| 5,318,194 | 6/1994 | Wiese | 221/123 |

FOREIGN PATENT DOCUMENTS

| | | | |
|---|---|---|---|
| 749371 | 5/1933 | France | 221/133 |
| 2 560 092 A1 | 2/1984 | France . | |
| 10133 | 1/1977 | Japan | 358/299 |
| WO84/00911 | 9/1982 | WIPO . | |
| WO84/01453 | 9/1983 | WIPO . | |

OTHER PUBLICATIONS

"Computer Controlled Engraving An Introduction," *Engravers J.* 12–49 (1980).

"Computer Controlled Engraving Part Two," *Engravers J.* 12–53 (1980).

"Computer Controlled Engraving Part Three," *Engravers J.* 8–40 (1980).

"Computer Controlled Engraving Part Four: Owner Reports," *Engravers J.* 10–75 (1980).

*Primary Examiner*—Daniel W. Howell
*Attorney, Agent, or Firm*—Limbach & Limbach L.L.P.

[57] ABSTRACT

An automated apparatus and method for engraving a workpiece selected from a plurality of workpiece styles, and dispensing the engraved workpiece along with a related accessory. Upon receipt of workpiece selection and text information supplied by a user, the controller generates drive signal which cause the apparatus to: retrieve the selected workpiece from one of a plurality of workpiece storage columns, move the workpiece to an engraving location, engrave the workpiece using a workpiece-specific engraving tool pressure, and dispense of the accessory from one of a plurality of accessory storage columns.

23 Claims, 24 Drawing Sheets

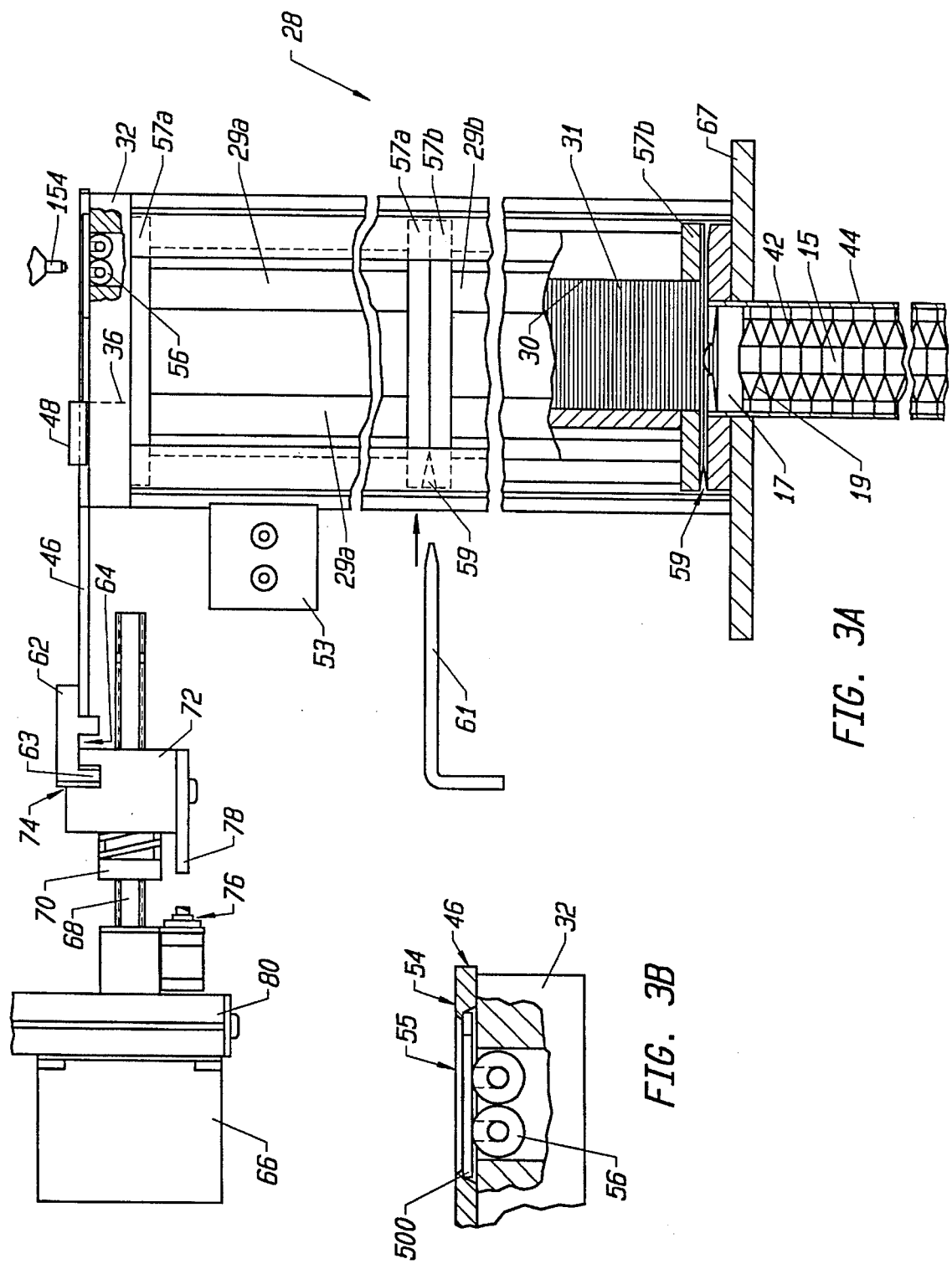

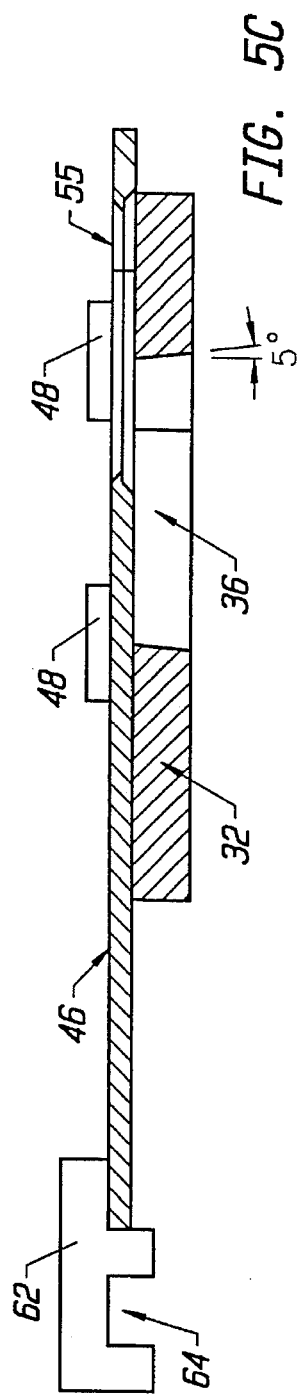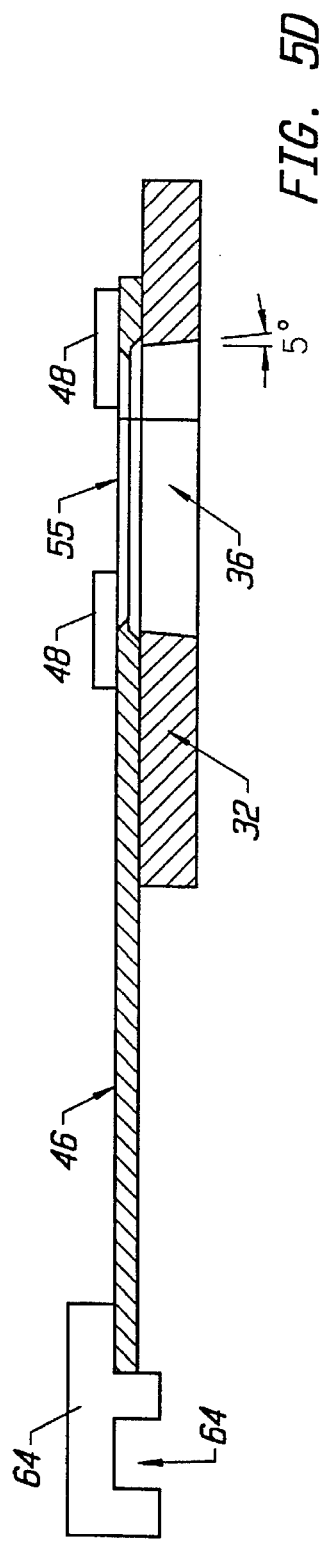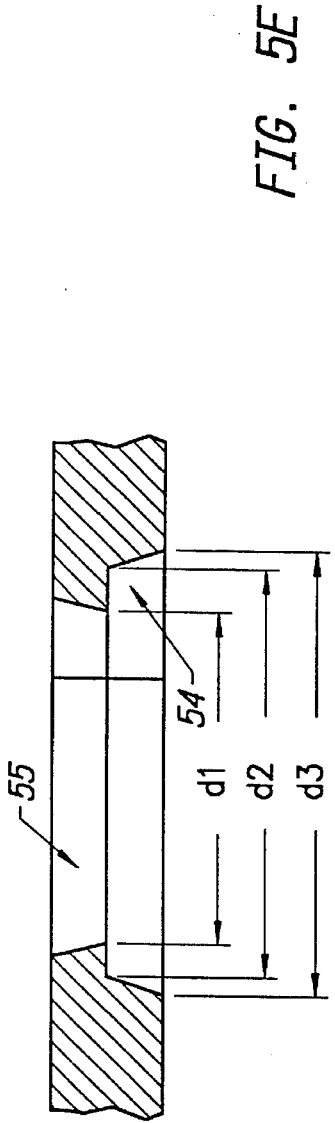

AUTOMATED ENGRAVING APPARATUS AND METHOD

FIELD OF THE INVENTION

The present invention relates to the field of engraving methods and devices and, particularly, to an automated apparatus and method for performing engraving functions.

BACKGROUND OF THE INVENTION

Many single engraving applications have been hampered by the need for and general lack of skilled engraving machine operators. Prior to 1980 and the advent of computerized engraving machines this was even more pronounced because many of the skills required to use a manual engraving machine involved manual dexterity. Computerized engraving machines, such as those described in U.S. Pat. Nos. 4,437,150, 4,439,834, and 4,561,814, each to Dahlgren, Jr. et al and each incorporated herein by reference, eliminated or simplified many of the thought processes associated with engraving. A number of these early machines also simplified much of the material handling aspects of the trade as well.

From that time until now little has changed. For a wide variety of applications the computerized engraving machines is still, by far, the best solution. However, relatively skilled operators are still required to deal with many aspects of the engraving process, such as material selection, cutting tool selection, layout details, workpiece fixturing and cutting speeds and feeds. The present challenge is to limit or eliminate the high skill levels usually associated with engraving so that the process becomes practical for more and more businesses or users.

SUMMARY OF THE INVENTION

This invention incorporates an automatic three axis engraving system with an automatic material handling system and interfaces them with a user friendly front end software system thereby supplanting the need for a skilled operator to produce an engraved workpiece.

The front end software system receives user-supplied selections of indicia (i.e. the text, designs, pictures etc. to be engraved onto the workpiece) and workpiece type, and a controller uses the user-supplied information to manage the physical operation of the engraving system. The controller performs three general functions: (1) workpiece handling, or the movement of a workpiece of the selected type into an engraving location and dispensing the workpiece to the user following engraving; (2) X-, Y-, and Z-axis engraving tool movement, which includes movement of the engraving tool as needed to engrave the text or other indicia onto the workpiece (by X-and Y-axis movement) and adjustment of engraving tool pressure on the workpiece (Z-axisa adjustment); and (3) accessory dispensing, which is the selection and dispensing of an accessory corresponding to the selected workpiece.

The workpiece handling system is preferably a stepper motor driven system which moves the workpiece from a self actuated delivery location, transports it to an engraving location where it is automatically clamped in place, and then releases the workpiece into an exit chute after engraving is complete. Workpieces are stacked vertically and stored in a plurality of columns, with each column storing a different type of workpiece.

Each column is equipped with a spring-driven positive feed mechanism which pushes the stack of workpieces vertically upwards such that the top workpiece in the stack is pushed into a relief formed in the bottom surface of a clamping/transport plate. The relief is shaped, within close tolerances, to match the shape of the workpiece. Uniform workpiece movement within the columns is assured by maintaining the spring within a substantially linear operating range and preventing the spring from binding.

At the start of the engraving operation, the clamping/transport plate corresponding to the selected workpiece is engaged by the workpiece handling system and advanced until the workpiece captured in its relief is positioned over upwardly biased rollers. The rollers positively clamp the workpiece inside the relief and also facilitate travel of the clamping/transport plate.

A cutout is formed in the top of the clamping/transport device which provides a window through which the engraving tool may engrave the workpiece. After the workpiece is engraved, the workpiece handling system advances the clamping/transport plate to a dispensing location, wherein the workpiece drops from the relief in the clamping/transport plate and into a dispensing chute.

A stepper motor driven, three axis engraving unit is moveable between the engraving locations associated with each column. The engraving unit is preferably provided with a spring loaded diamond tip for drag (or scratch) engraving of materials. Stroke width, which is determined by diamond geometry, may be adjusted by varying the amount of Z-axis pressure exerted on the tool. The pressure on the diamond tip is variable and can be pre-programmed in the system, thus allowing for uniform engraving results over a range of materials and thicknesses. Adjustments to tip pressure are preferably carried out by raising or lowering the tip height using a Z-axis stepper motor. This engraving unit design is also compatible with air driven rotary spindles and direct drive rotary spindles.

The workpiece remains motionless during the engraving process while the cutting tool moves in combinations of linear, step sequences along the X and Y axes, respectively, thereby effectively producing both linear and arcing motion as needed to engrave the various characters of the text. Computerized engraving using stepper-driven X-and Y- axis movement is described in U.S. Pat. No. 4,437,150 and is incorporated herein by reference.

In the present invention, Y-axis motion of the engraving tool is achieved by means of a stepper driven Y-axis carriage which supports the engraving tool. The Y-axis carriage is itself mounted to an X-axis carriage assembly which travels along a bridge extending along the X-axis. This dual carriage system facilitates increased engraving speed, as compared with existing computerized engraving systems, by allowing for engraving tool movement in the Y direction. Existing devices require movement of the actual workpiece in the Y axis direction and thus have slower engraving speeds because of the relatively high total mass in motion.

A "place and pick" accessory dispenser is provided which is instructed by the controller to dispense an accessory (e.g. luggage tag strap, pet tag hook, medical tag bracelet) which corresponds to the chosen workpiece. Accessories are stored in a plurality of vertical columns, each of which stores a different accessory type.

Accessory dispensing is carried out by a picker arm which, when positioned beneath the column holding the appropriate accessory, rotates through a slot in the column to eject an accessory package through a second slot in the column side and into a dispensing chute. The dispensing operation is accomplished by two stepper motors: a "place" motor which moves the picker arm into alignment with the appropriate column; and a "picker" motor which rotates the picker arm after it is placed in proper picking position by the "place" motor.

BRIEF DESCRIPTION OF THE DRAWINGS

FIG. 3A is a side view of the workpiece positioning unit of the present invention engaged with a clamping plate associated with a workpiece delivery column.

FIG. 3B is partial side section view of an anvil according to the present invention.

FIG. 5B–5E are cross-sectional side views of the anvil and clamping plate taken along the plane designated 5B–5B in FIG. 5A. The alignment of cut out in the clamping plate relative to the through hole in the anvil for the workpiece delivery, workpiece engraving and workpiece receiving positions respectively.

DETAILED DESCRIPTION OF THE PREFERRED EMBODIMENT

Figure 1A:
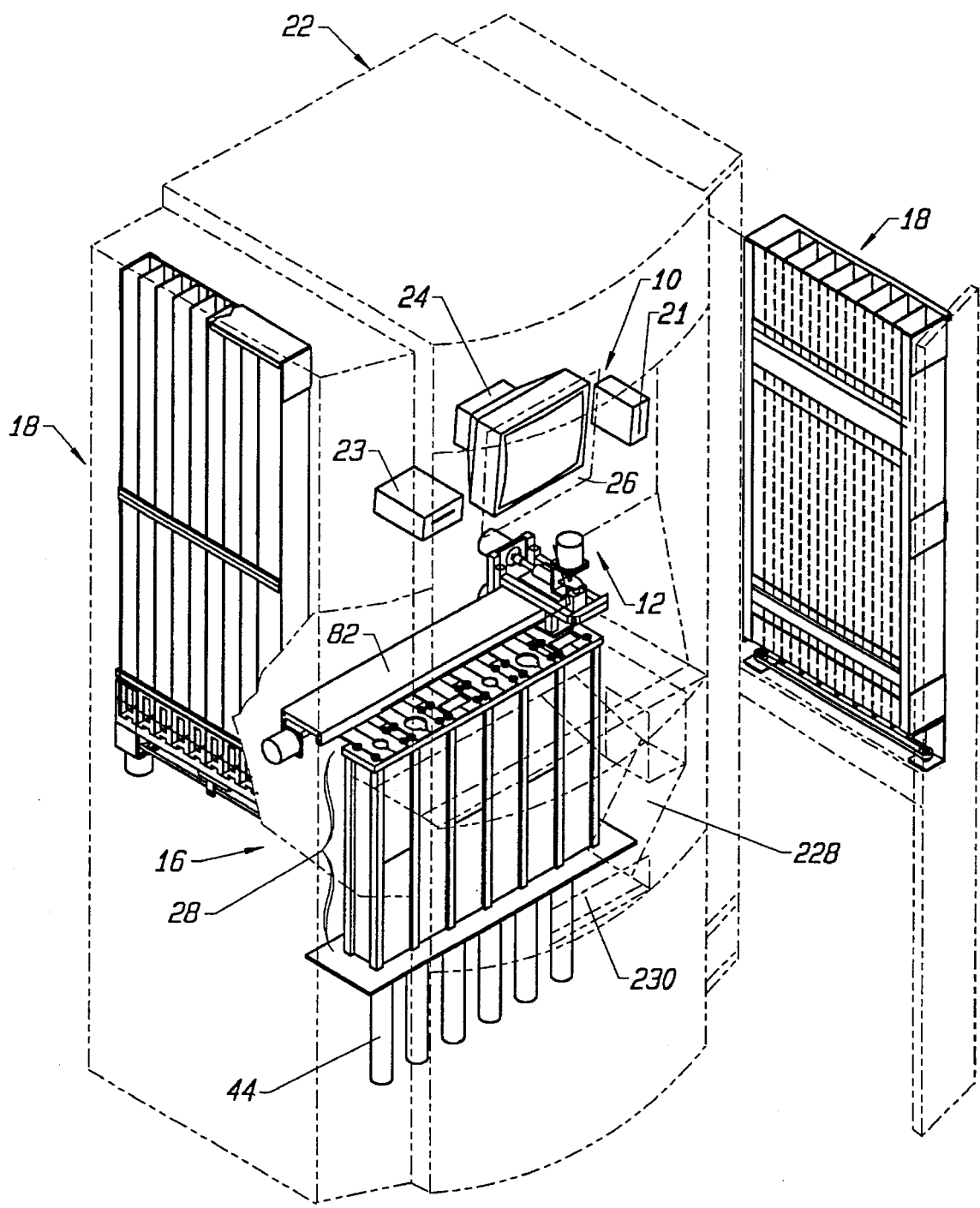
FIG. 1A is a simplified schematic representation of an automated vending unit according to the present invention, showing the components of the present invention mounted in a vending booth.

The engraving machine of the present invention is comprised generally of a user interface device 10, which prompts for and receives engraving instructions from a user, and a controller (not shown) which manages the engraving functions and the dispensing of accessories.

Controlled by the controller are an engraving unit 12, a workpiece positioning unit 14 (see FIGS. 3 and 4)which receives workpieces from a workpiece delivery system 16, and a pair of accessory dispensing units 18. As will be discussed in detail, the controller provides drive signals to stepper motors that drive the workpiece delivery, engraving, and accessory dispensing functions. Conventional drivers (micro-stepping for the X-axis and Y-axis control and half-stepping for the workpiece handling, accessory dispensing, and Z-axis control) may be used in connection with the present invention. One such controller, including its use in connection with stepper motors, is described in U.S. Pat. No. 4,437,150. In the preferred embodiment, the Dahlgren Control Systems Part No. 39-89028 micro-stepping driver and the Dahlgren Control Systems Part No. R60-0001 half-stepping driver are used.

The user interface device 10 is preferably a personal computer ("PC") having a video monitor 24 which prompts the user to select a workpiece type (e.g., luggage tag, medical tag, key ring, or pet tag), and the text to be printed on the desired workpiece. A conventional video touch screen 26 overlays the video monitor 24 and is interfaced with the personal computer. The personal computer prompts for and receives the user information necessary to begin a job, and also may receive and process payment information. For example, a credit card reader, a modem for use in verifying credit information, and a receipt printer may be interfaced with and controlled by the personal computer. As will be described below, the user input from the user interface device 10 is passed to the controller 20, processed, and used by the controller in retrieving the relevant engraving format and engraving tool pressure from its memory, managing the workpiece retrieval and engraving operations, and dispensing the appropriate accessory (i.e. luggage tag strap, medical tag bracelet, etc.) to be dispensed along with the engraved workpiece after engraving is complete. To facilitate an understanding of these features, reference will be made to X-, Y-, and Z- axes, each of which is designated in FIG. 2.

In the preferred embodiment, each component of the engraving system is incorporated into a vending machine style housing 22.

Workpiece Delivery and Handling Units

Referring to FIGS. 2–5, the workpiece delivery unit 16 of the present invention is configured to offer the user a variety of workpiece types from which to choose from. The workpiece delivery unit 16 provides a number of positive feed columns 28 which use spring pressure to feed workpieces into a position from which they can be retrieved by the workpiece handling unit 14 (FIG. 4) and carried to an engraving location.

Figure 3C:
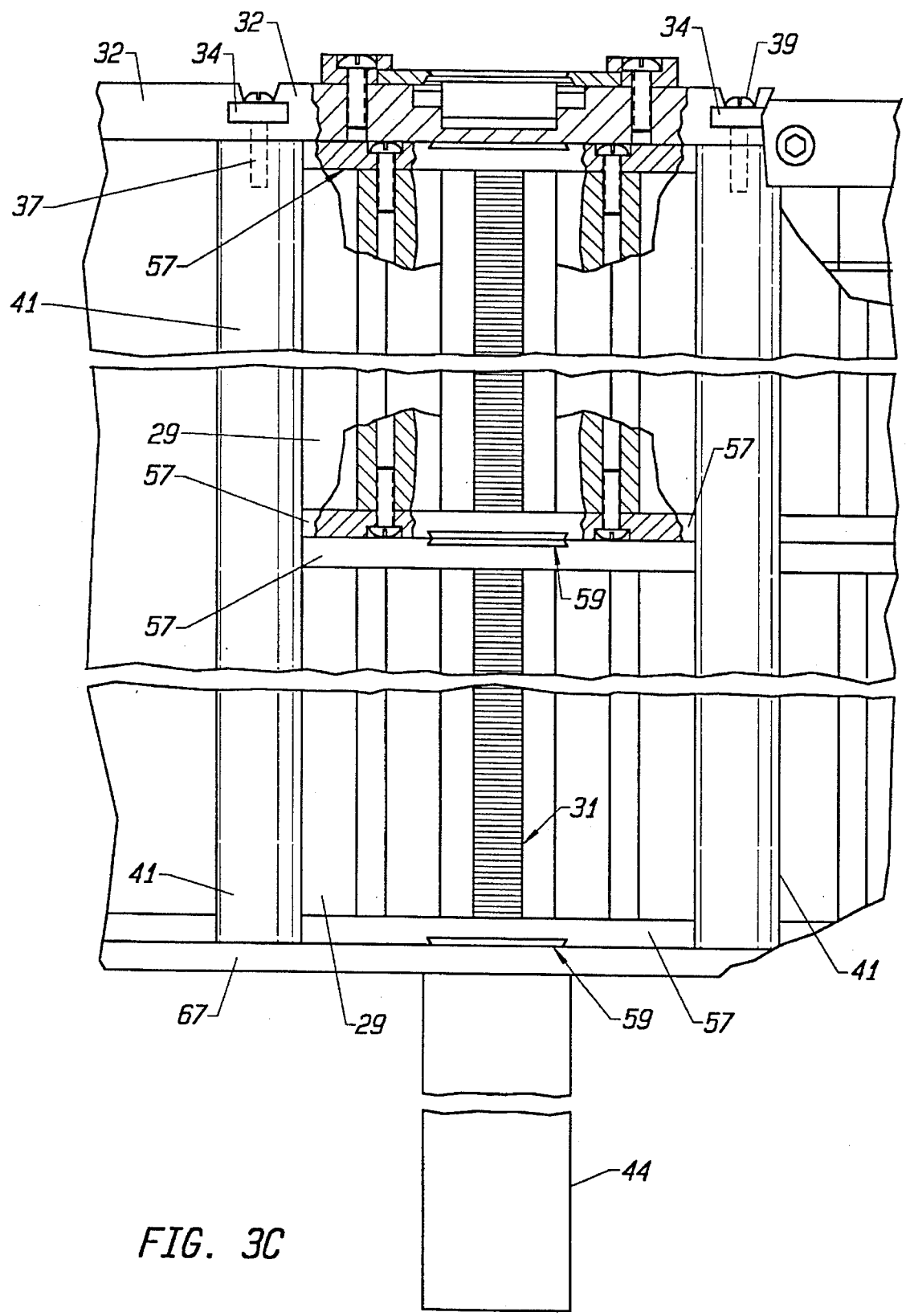
FIG. 3C is a from view of a workpiece column.

A number of workpiece columns 28 are provided, each corresponding to one of the workpiece types offered to the user. Referring to FIGS. 3A and 3C, each workpiece column 28 is preferably one or more elongate extrusions 29a, 29b of precision-machined material, such as aluminum, each having a throughbore 30a, 30b in the shape of the workpiece which is contained in the workpiece column. Stored in each column 28 is a stack 31 of workpieces (FIG. 3A).

Coupled to each workpiece column 28, and contiguous with the throughbores 30a, 30b in each column, is a hollow, cylindrical tube 44 (FIGS. 1A and 3A). In the preferred embodiment, the workpiece column 28 and the cylindrical tube 44 are proportioned such that approximately 150 to 300 workpieces, depending on workpiece mass, may be stored in each column. The large capacity of the columns allows many engraving operations to be performed before restocking of workpieces is needed.

Referring to FIG. 3A, disposed within each tube 44 is a spring 42 which provides the feeding force to push the stack 31 of workpieces upwardly through the extrusions 29a, 29b and that therefore pushes the topmost workpiece (not shown) of each column into a relief formed in a corresponding clamping plate 46 (FIG. 3B). The clamping plate 46 is preferably precision-machined and, as detailed below, it is the structure that holds the workpiece in place during engraving.

Each spring 42 should be individually sized to accommodate the shape, mass and quantity of the workpieces in its respective column. Proper functioning of the workpiece delivery unit 16 involves use of a matured spring operating within ±30% of its overall operating length. In other words, spring length is chosen such that the spring is compressed to no less than 30% of its mature length when the column is full of workpieces and such that the spring is at no greater than 70% of its mature length when the column is empty. Maintaining this operating range insures a substantially linear spring force, within the limits of the spring. Consequently, proportionally greater spring force is obtained when the column is full verses nearly empty. This keeps the upward pressure of the workpiece at the clamping plate 46 within an acceptable range over the entire delivery range of the column 28. A mature spring is obtained by placing a new spring under compression for approximately 10–12 hours.

The springs 42 are managed inside the columns 28 to insure they do not bind. This is achieved by guiding the springs and by encouraging them to rotate as they expand and compress. Without this, there is a tendency to bind and affect feeding pressure.

In the preferred embodiment, two steps are taken to prevent binding of the springs 42. First, a rod 15 (FIG. 3A) is disposed within each spring 42 and is held in place by a cap 17 resting on the upper end 19 of the spring. The rod 15 helps prevent the spring 42 from bowing, which in turn prevents the spring from binding against the inside walls of the extrusions 29a, 29b. Second, the spring is left unsecured within the tube 44 and can therefore freely rotate.

Figure 5A:
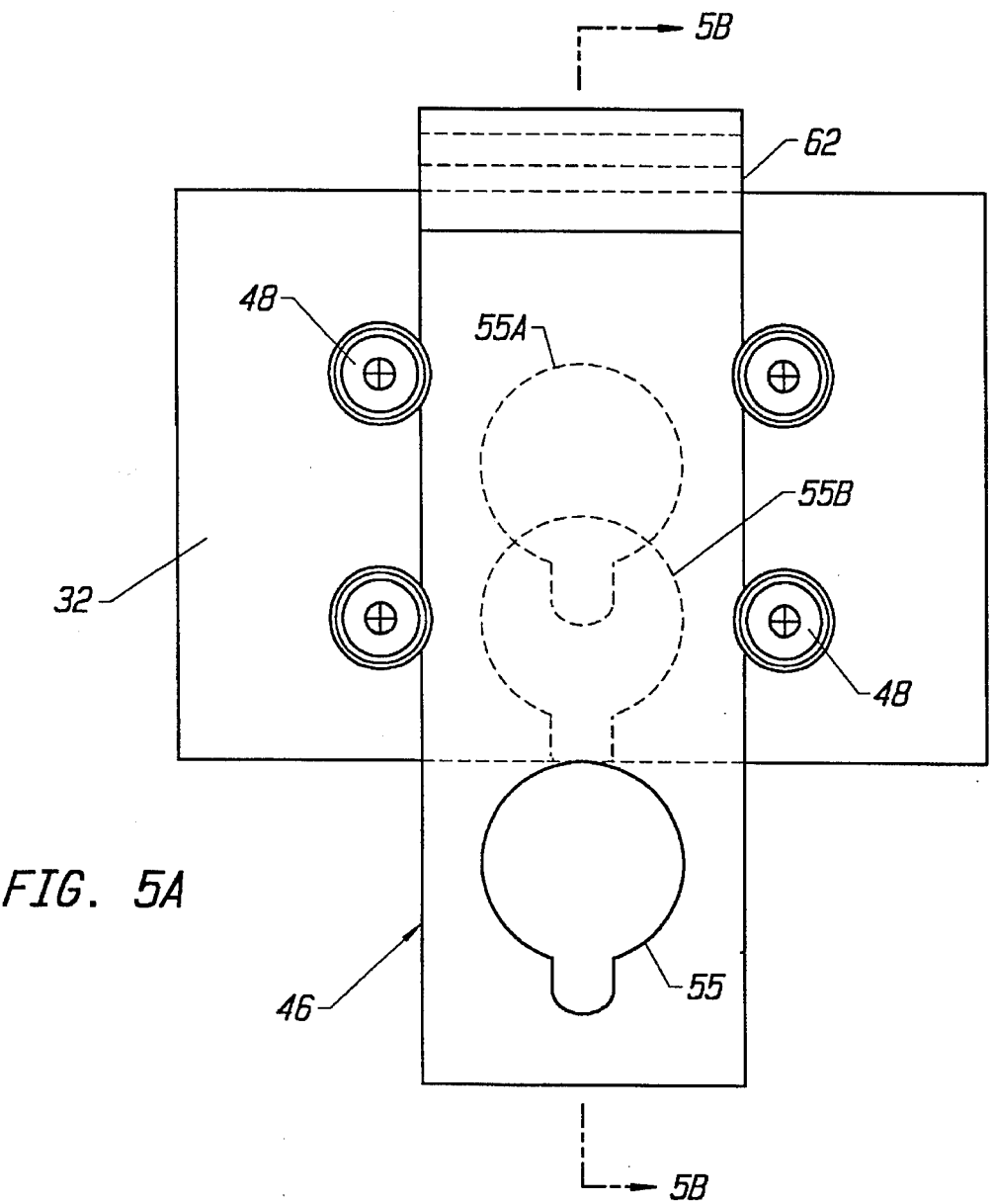
FIG. 5A is a top view of an anvil and a clamping plate.
Figure 5B:
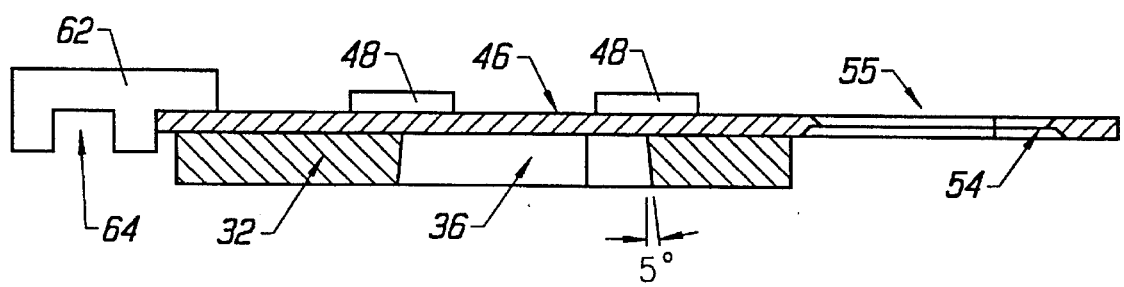

At the top of each column 28 is an anvil 32 (FIGS. 2, 3C and 3D) which is preferably precision machined. Each anvil is connected to its neighboring anvils by joining plates 34, which help to optimize the rigidity of the overall system. Each anvil has a hole 36 in the shape of the related workpiece (FIG. 5B). The hole 36 is chamfered at the top side 38 of the anvil to facilitate movement and greater tolerance of the workpiece. On the bottom side of the anvil, the hole 36 matches up to the throughbore 30a of its respective upper extruded column 29a.

The holes 36 in the anvils 32 are machined to tighter tolerances than are the throughbores 30 in their corresponding extrusions so as to guide workpieces into the corresponding clamping plates 46. Preferably, the inside diameter of the extrusion throughbores 30a, 30b is nominally 0.020 inches larger than its respective anvil hole 36. In addition to the chamfer, the anvil hole has a 5° top to bottom relief angle on its inside diameter. Consequently, the extruded column and the anvil provide for an economical yet precise feeding mechanism.

Figure 7:
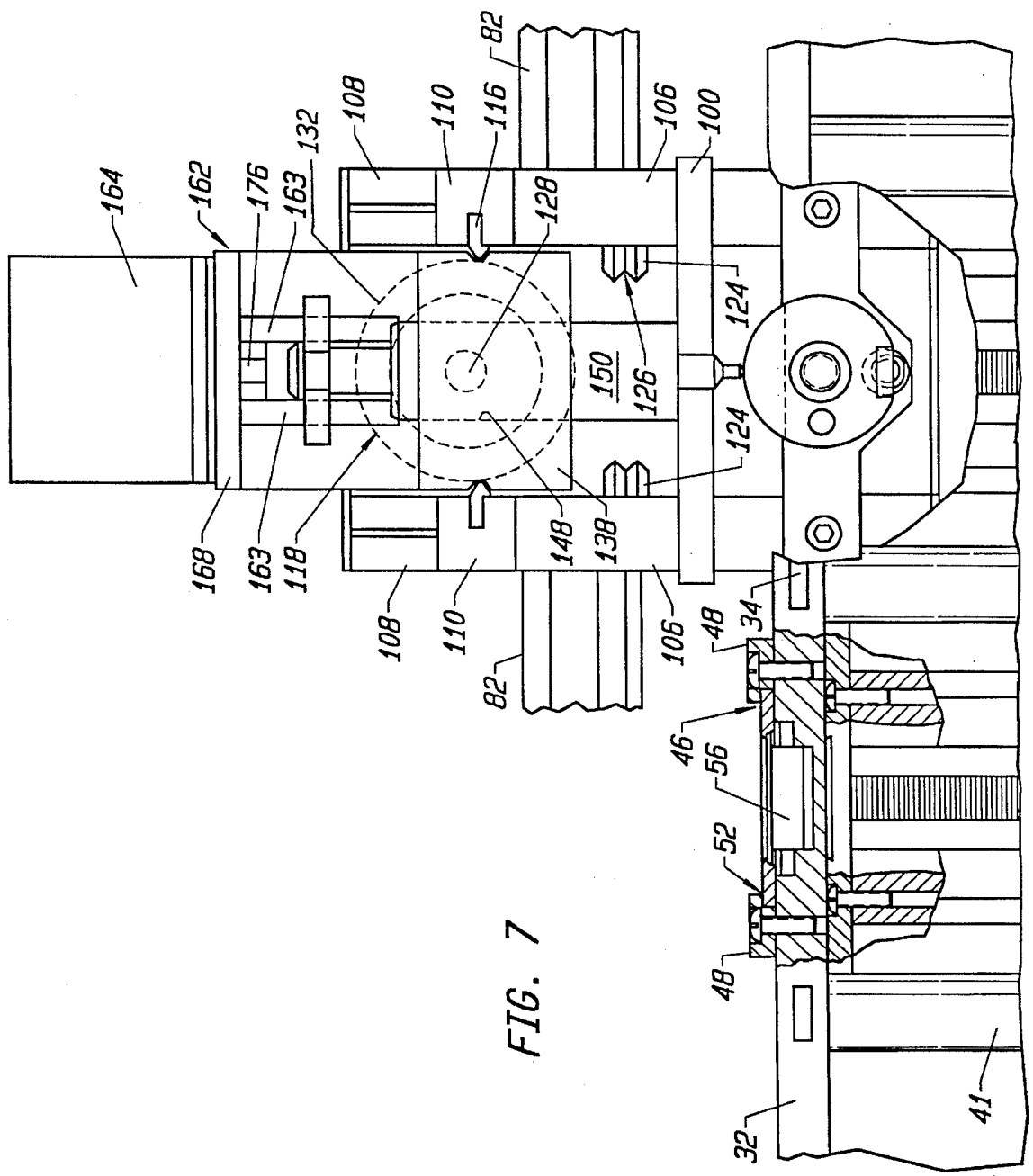
FIG. 7 is a from view of the engraving unit of the present invention.

Four stationary guides 48 are fixed to the top of each anvil. The guides 48 are preferably made of nylon, turcite, or TEFLON® and each is individually adjustable. Each guide 48 has a notch 52 along its circumference to accommodate the clamping plate 46 as it moves from the receiving, to the engraving, to the dispensing positions. (See FIG. 7)

Figure 3D:
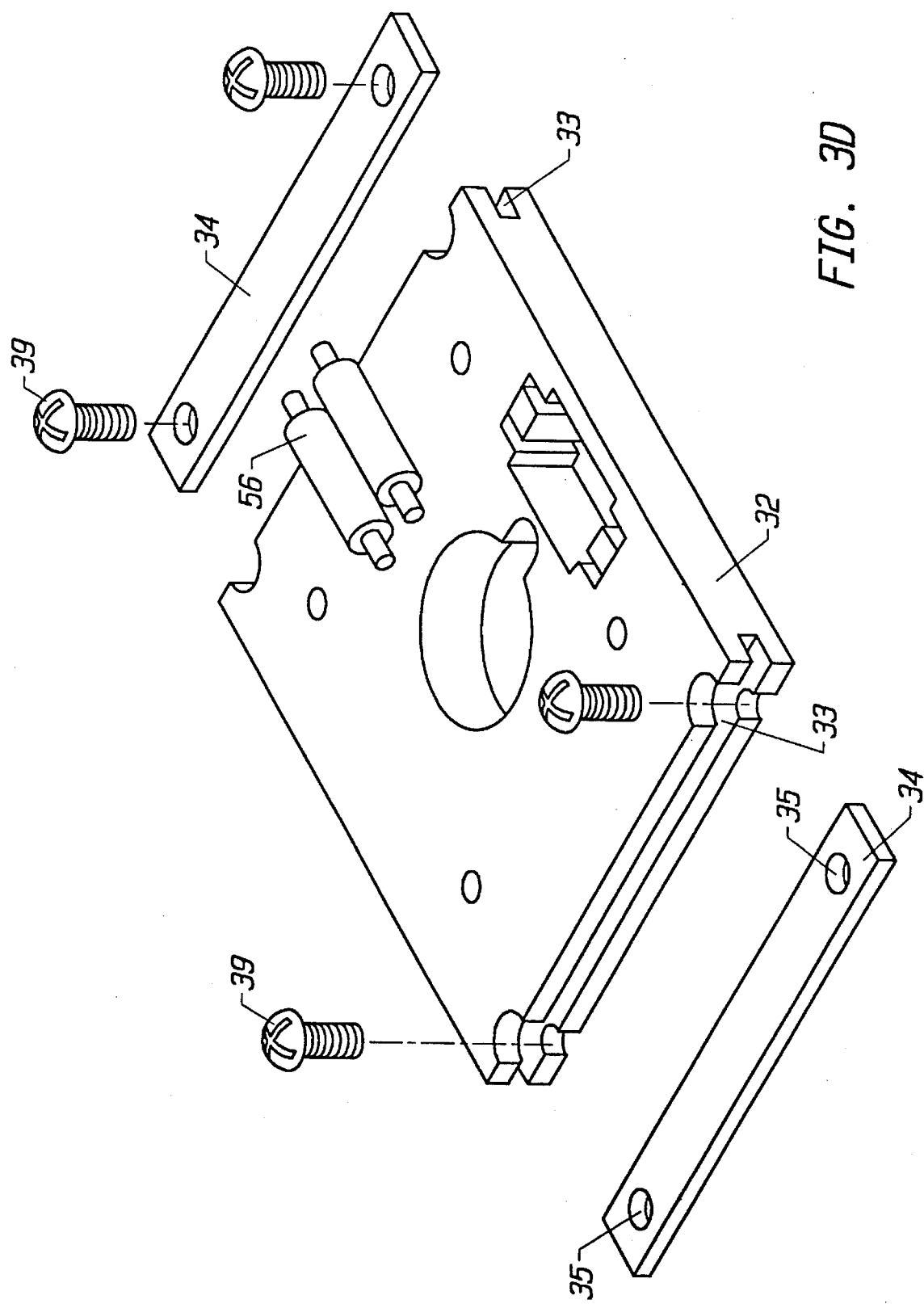
FIG. 3D is an exploded view of an anvil, with the clamping plate guides not shown.

Embedded in each anvil 32, at the engraving position of the workpiece, is one or more elongate rollers 56 (see FIG. 3D). Each roller 56 is mounted for rotation about its elongate axis. The rollers are spring biased in a direction normal to the top surface 38 of the anvil.

As illustrated in FIGS. 2, 3C and 4, 5A–5E corresponding to each anvil 32 is a clamping plate 46 which is slidable within the notches 52 in the guides 48. Since each guide 48 is adjustable, the centering and squareness of the clamping plate 46 relative to the column 28 and the engraving position may be fine-tuned. The clamping plate 46 is an elongate rectangular member which has a relief 54 formed in its underside, near its distal end. (See FIG. 3B) Preferably, the relief 54 is in the shape of the corresponding workpiece. The relief is oversized to the workpiece preferably by a nominal 0.0035 inches all around the sidewalls of the relief looking at the bottom of the clamps, preferably having relief angles themselves of 7° down to a depth of 0.032 inch (based on a nominal 0.040 inch workpiece). The relief depth is nominally sized to the workpiece thickness, in this case 0.040 inches. The design allows for tolerances of up to ±0.0025 inches through the use of leading and trailing edge chamfers in the anvil.

Centered around the relief is a cutout 55 in the shape of the workpiece. During engraving, the cutout 55 provides access to the workpiece by the engraving tool while relief 54 keeps the workpiece secure beneath the clamping plate 46.

The relative diameters of the cutout 55 and relief 54 are shown in FIG. 5E. The outer diameter of the relief tapers from a first diameter, designated d3, to a second diameter designated d2. The inner diameter d1 of the cutout 55 is smaller than the second diameter d2 of the relief such that a shoulder is formed between them. The workpiece is in abutment with this shoulder when it is captured within the relief 54.

The clamping plate 46 is preferably plated to minimize wear and contamination in the slide and bearing areas.

Attached to the proximal end 60 of the clamping plate is a receiving component 62 which has a chamfered slot 64 formed in its underside. (See FIG. 3A)

In the material receiving stage (FIG. 5D), the upward spring force from the workpiece delivery system 16 causes the topmost workpiece in each workpiece stack 31 to pass through the through hole 36 in the anvil and to rest in the relief 54 in the corresponding clamping plate 46. During the material positioning phase (FIG. 5C), the clamping plate 46 (and the workpiece situated within its relief) is slidably advanced over the top surface of the anvil, between the guides 48, until the workpiece rests on the rollers 56 as shown in FIG. 3B. This is the engraving location, wherein the rollers are immediately beneath the workpiece (designated 500 in FIG. 3A, and 55B in FIG. 5A) and thereby provide upward pressure which holds the workpiece in place during engraving. Because the cutout 55 is slightly smaller than the workpiece, the workpiece cannot pass through the cutout but instead remains captured beneath the clamping plate 46.

Figure 4:
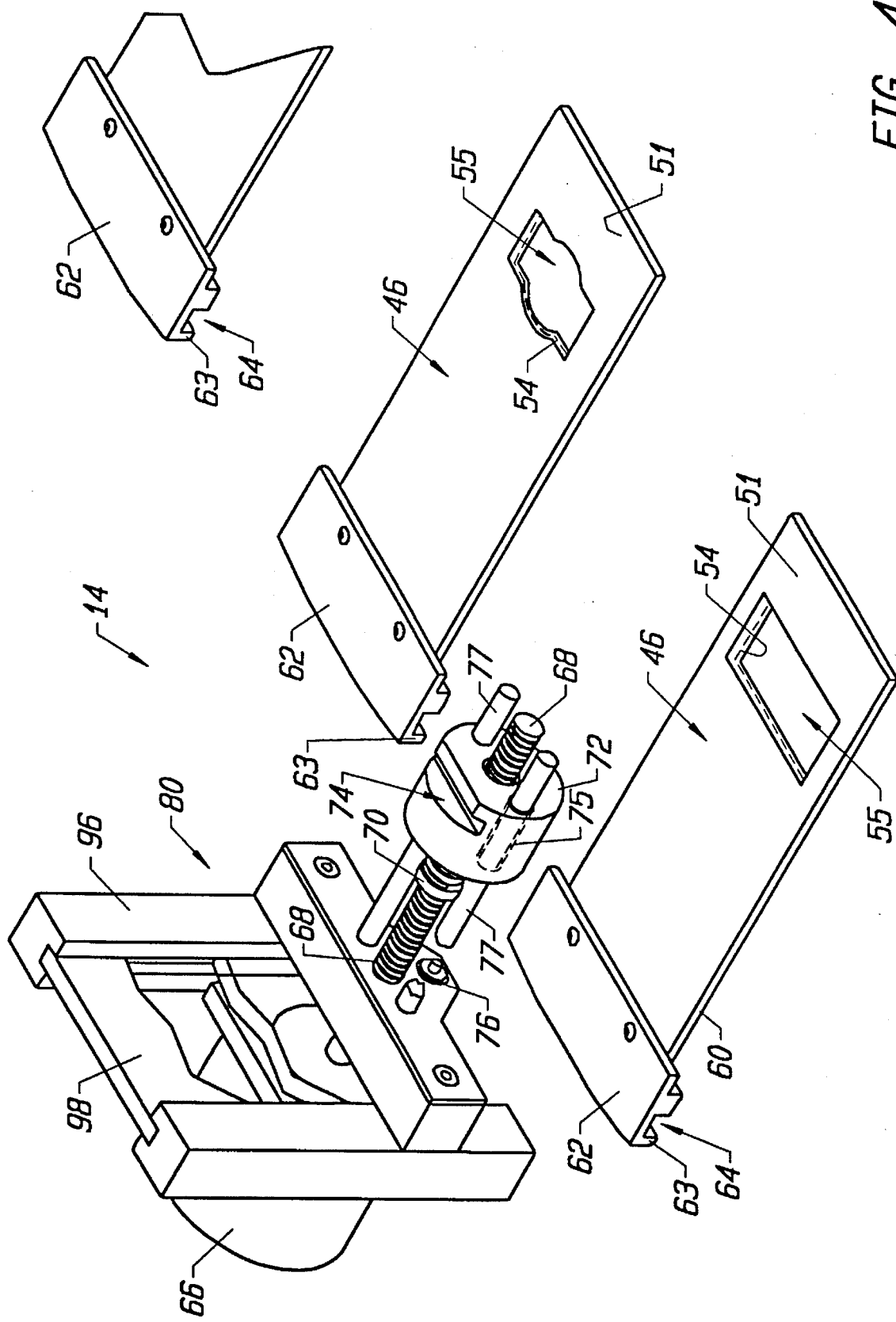
FIG. 4 is a perspective view showing a portion of a carriage, the workpiece positioning unit mounted to it, and a pair of clamping plates.

From FIGS. 3A and 4 it can be seen that the workpiece handling unit 14 includes a stepper motor 66 mounted to a carriage 80 and coupled to a leadscrew 68. A limit switch 76 is mounted to the carriage 80 near the proximal end of the leadscrew 68. Fastened to the leadscrew is a self-adjusting leadscrew nut 70.

The leadscrew nut 70 is attached to a workpiece selector block 72 which has a chamfered slot 74. A pair of throughbores 75 (FIG. 4) pass through the workpiece selector block 72. Rods 77 are slidably received in each throughbore 75. A triggering plate 78 (FIG. 3A) is fixed to the workpiece selector block 72 so as to close the limit switch when the workpiece selector block 72 reaches the proximal end of its travel.

Activation of stepper motor 66 results in rotary motion of the leadscrew 68 and corresponding linear movement of the leadscrew nut 70 and the workpiece selector block 72 attached thereto. The selector block 72 slides over rods 77, which help to maintain stability of the workpiece positioning unit during movement of the selector block 72.

When selector block 72 is engaged with a receiving component 62 as shown in FIG. 3A, linear movement of the workpiece selector block 72 along the leadscrew 68 results in linear movement of the receiving component 62 and its associated clamping plate 46. In this fashion, the workpiece handling unit 14 moves the clamping plate between three positions. Each of the three positions is predetermined and is arrived at by stepping the stepper motor through a predetermined number of incremental steps in the desired direction.

The first position is the workpiece retrieval position (FIG. 2 & FIG. 5D), in which the clamping plate 46 is positioned such that the relief 54 in the clamping plate is aligned with the hole 36 in the anvil 32. When the clamping plate is in the workpiece retrieval position, the top workpiece in the associated column becomes captured in the relief 54 due to the upward force of the spring 42.

The second clamping plate position is the engraving position (FIGS. 3A, 3B and 5C), in which the clamping plate is moved away from the carriage 80 such that the workpiece captured by the clamping plate 46 is resting on anvil rollers 56. The third position is the dispensing position (FIG. 5B), in which the clamping plate 46 is advanced still further from the carriage 80 (not shown in FIG. 3C) such that the relief 54 is away from the anvil and such that the workpiece can drop from the relief into a dispensing churn (designated 230 in FIG. 11). For purposes of comparison, FIG. 5A shows the location of the cut out 55 and relief 54 in the material receiving position (designated 55a) and the material engraving position (designated 55b) in dotted lines.

After an engraving operation is completed, the clamping plate 46 returns to the material receiving position such that its receiving component 62 is aligned with the receiving components 62 of all the other clamping plates.

Figure 3E:
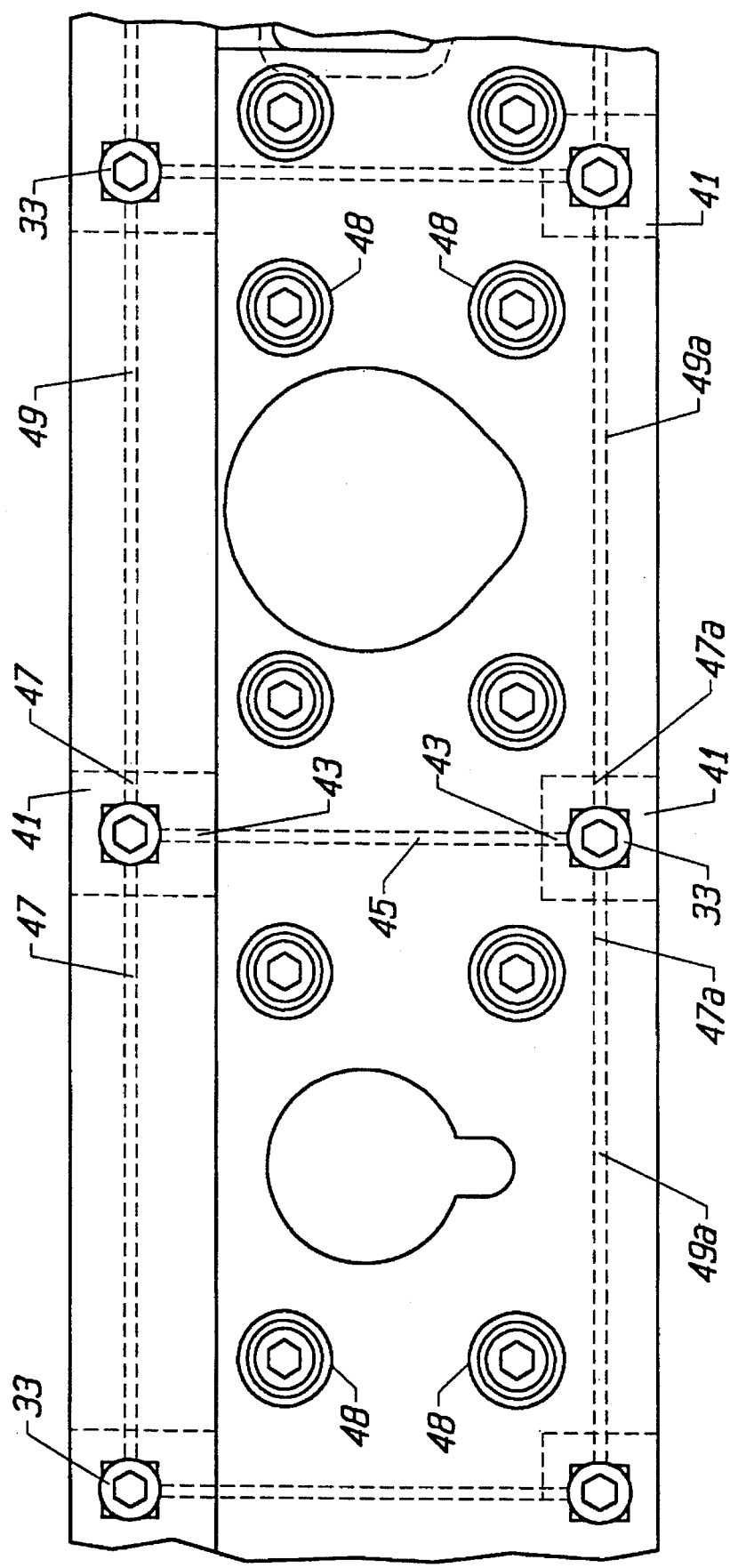
FIG. 3E is a partial top view of the workpiece columns.
Figure 3F:
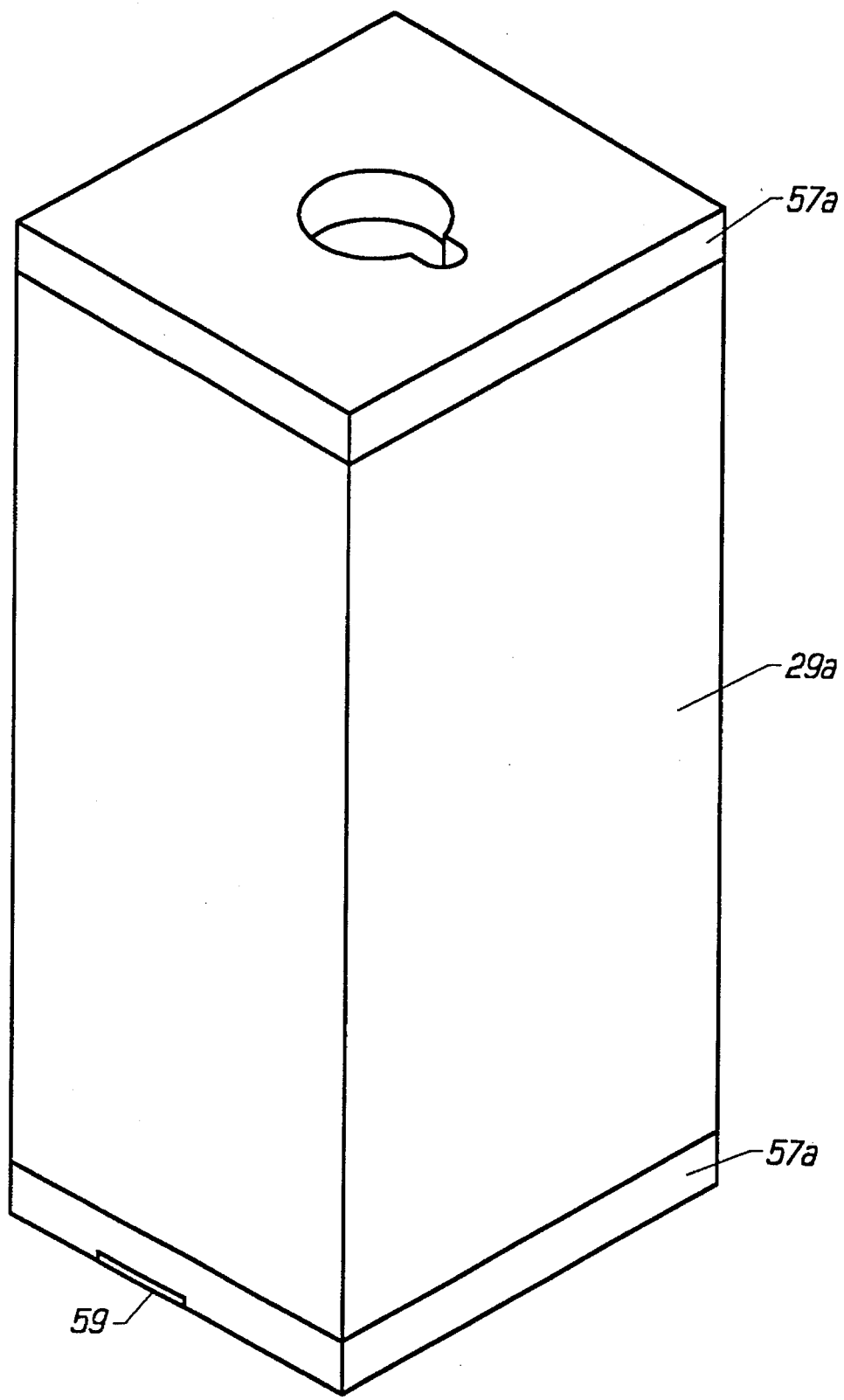
FIG. 3F is a perspective view of an extrusion from a workpiece column as it appears when the column walls and plates are in place.

Proper functioning of the engraving unit requires that the extruded columns 28 and the anvils 32 be precisely aligned with each other and with the clamping plate 46. Rigidity of alignment of these components is achieved using a number of supports. Referring to FIGS. 3C through 3E, it can be seen that each anvil 32 is secured to its adjacent anvils by joining plates 34. The joining plates 34 are positioned in slots 33 formed in the adjacent sides of the anvils, such that each joining plate 34 is disposed within two slots, one in each of two adjacent anvils 32.

Each joining plate 34 is provided with a pair of bores 35 (FIG. 3D). The bores 35 are aligned with second bores 37 formed in elongate vertical supports 41. A bolt 39 is passed through each joining plate 34 at bore 35 and throughbore 37 in the corresponding vertical support member 41. As bolt 39 is tightened, joining plate 34 clamps its associated anvils 32 to the elongate vertical support.

Referring to FIG. 3E, each vertical support member 41 has a first slot 43 which receives a dividing wall 45 that separates each column 28. Second slots 47, also formed in vertical support members 41 receive panels 49 which comprise the back wall of the workpiece dispensing unit. Slots 47a receive panels 49a to form a front wall on the workpiece dispensing unit. The dividing walls 45 and panels 49, 49a therefore bound the extrusion 29a, 29b on four sides and are in abutment with the corresponding four sides of the plates 57a, 57b attached to the ends of the extrusions 29a, 29b. These panels thus hold the extrusion 29a, 29b in place by virtue of the precision machined relationship between the plates 57a, 57b and the walls 45 and panels 49, 49a.

Figure 1B:
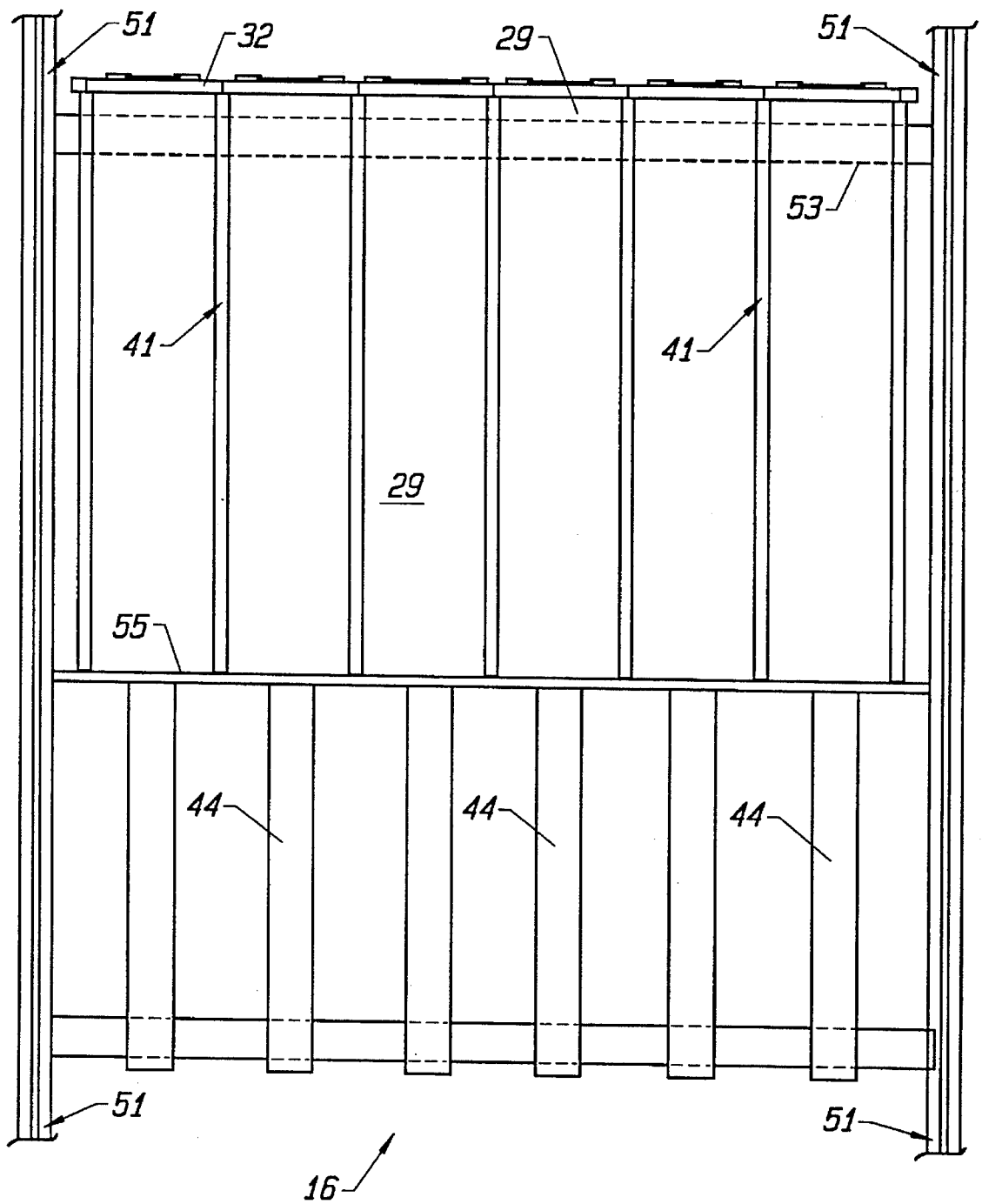
FIG. 1B is a front view of the workpiece dispensing unit of the present invention.

Referring to FIG. 1B rigidity of the overall workpiece delivery unit 16 is provided by a pair of precision machined steel side supports 51 which are held together by a rear support and alignment bar 53, which is also preferably precision-machined. Column base support 67, which is also connected between the steel side supports 51, supports the aluminum extrusions 29a, 29b and the vertical support members 41. Referring to FIG. 3C, each column may be provided with more than one aluminum extrusion 29 in order to facilitate loading of workpieces during maintenance of the engraving unit. Each aluminum extrusion is 29 has end plates 57a, 57b bolted to each end. Each end plate 57a, 57b has a cut-out (not shown) in the shape of the associated workpiece and aligned with the throughbore 30a, 30b. Slots 59 (see FIG. 3A) in each end plate provide a port through which an L-shaped tool 61 may be inserted during maintenance to retain spring 44 in a particular compressed condition.

When a column 28 is running low on workpieces, the spring 44 will be expanded above the end plates 57 of the lower aluminum extrusion 29 shown in FIG. 3A. To re-stock the workpieces, a rod (not shown) can be inserted through the hole in the anvil 32, and through the throughbore 30a in the upper aluminum extrusion 29a until the spring 44 and any remaining workpieces are depressed below the end plate 57a at the bottom end of the upper aluminum extrusion 29a. The L-shaped tool 61 may then be inserted between the plates 57a, 57b and the rod removed from the throughbore 30a. Once the spring 44 is contained in this way, workpieces may be added to the upper aluminum extrusion 29a. After loading, the L-shaped tool 61 is removed from the column 28 and the spring allowed to expand.

The columns 28 are designed for easy interchangeability. The type of workpiece stored in any column can be changed simply by substituting extrusions and anvils. Moreover, a single large extrusion may be easily substituted for two extrusions of the standard size in order to accommodate a large workpiece type. Consequently, machines can be reconfigured in the field by low skilled service personnel.

X-Axis Travel

The workpiece handling unit 14 is fixed to carriage 80, which also supports the engraving unit 12, and which transports the workpiece handling unit 14 and the engraving unit 12 along the X-axis.

Figure 2:
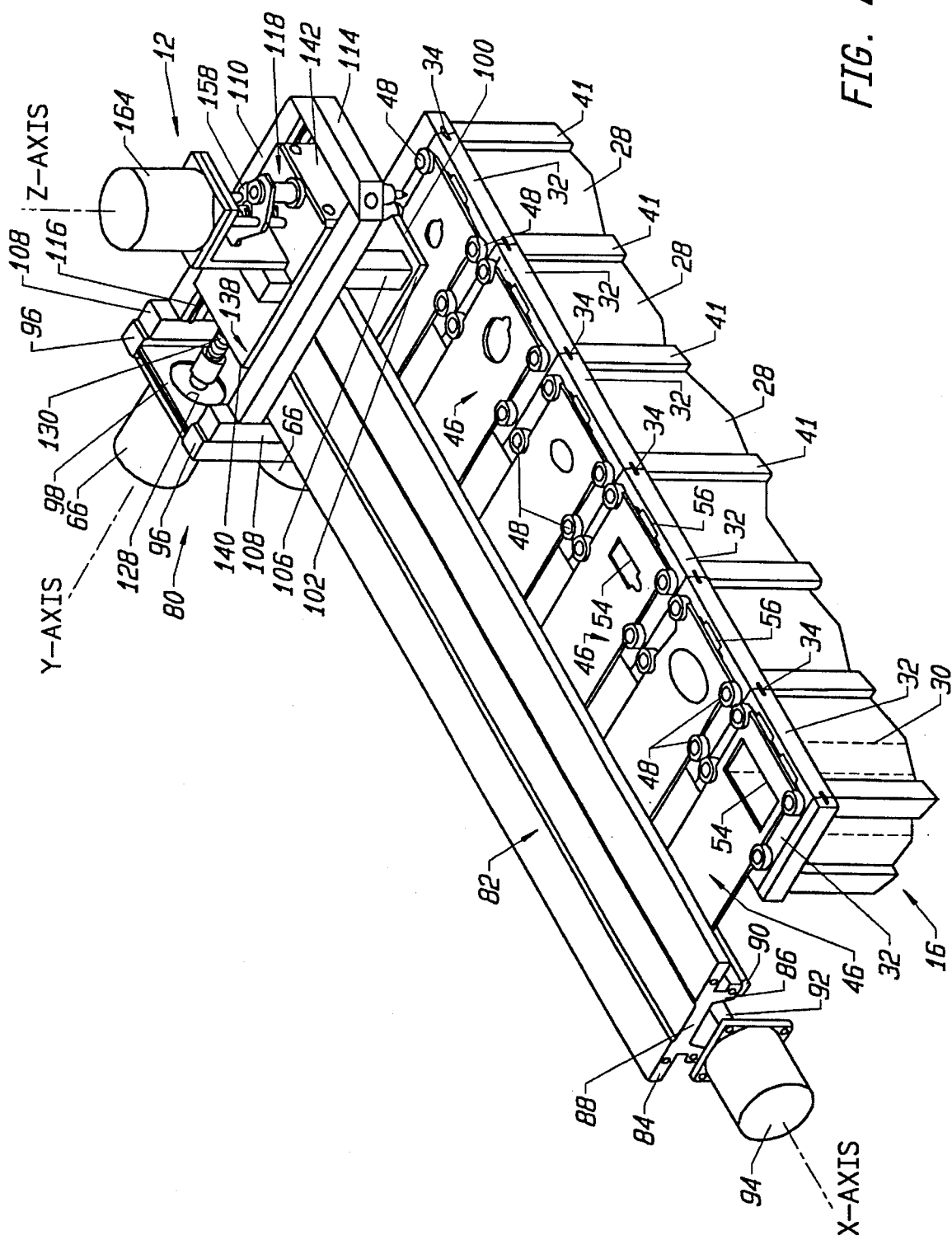
FIG. 2 is a perspective view of an engraving unit and a workpiece positioning unit according to the present invention.
Figure 6:
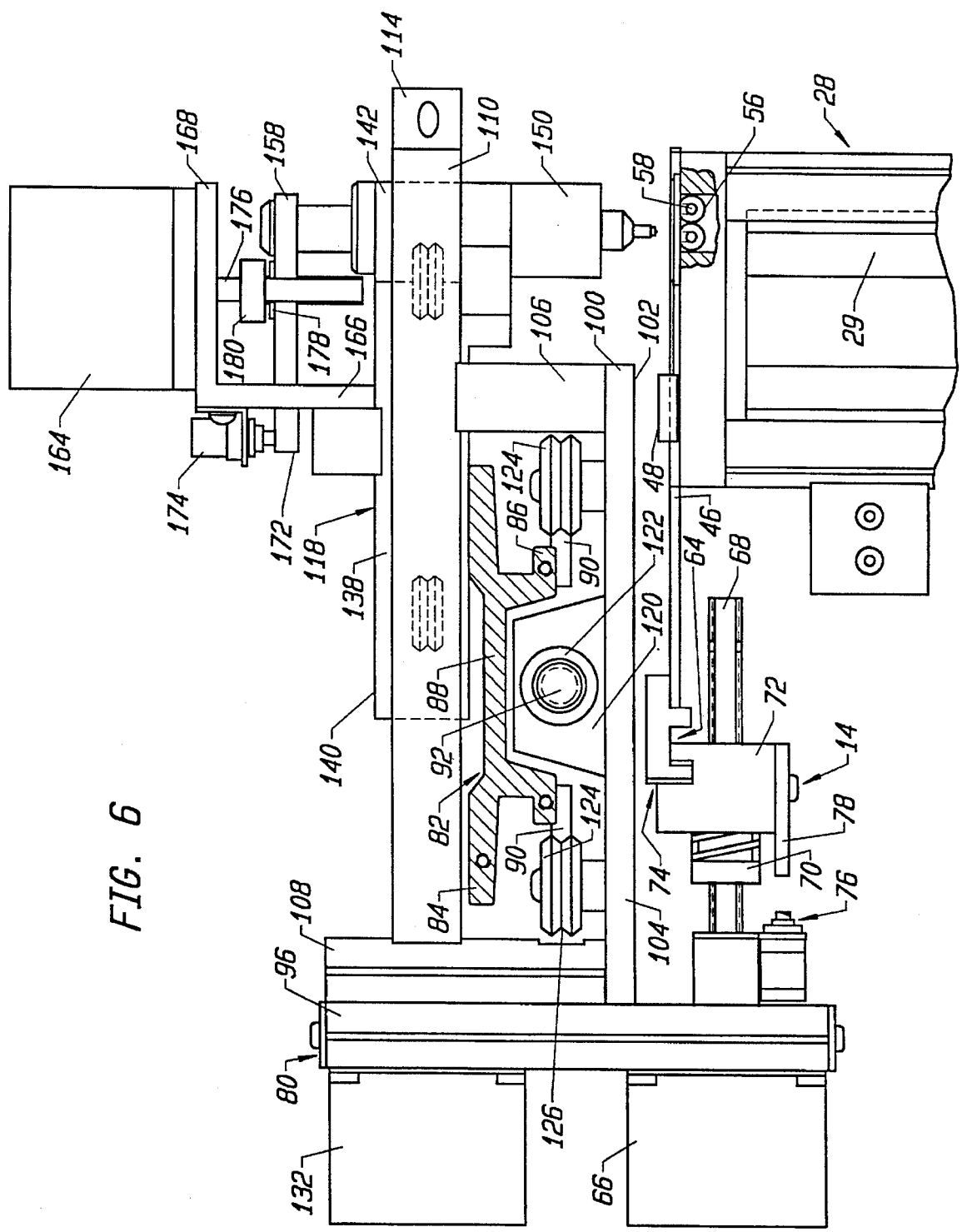
FIG. 6 is a side view of the carriage, engraving unit, and workpiece positioning unit, showing the X-axis bridge in cross-section.

Referring to FIGS. 2 and 6, X-axis travel occurs along a bridge 82, which is preferably precision machined from extruded aluminum. The bridge 82 has a substantially symmetrical cross-section, including a pair of upper flanges 84 and a pair of shorter, lower flanges 86. A web 88 connects the upper and lower flanges on one side of the bridge to those on the opposite side. Connected to each lower flange 86 is an elongate v-rail 90 which extends along the lower flange 86, parallel to the X-axis. These v-rails, which are preferably precision-machined, increase the stability of the bridge and they also provide a track which facilitates X-axis travel.

An X-axis leadscrew 92 extends along the X-axis, just below the web 88 of the bridge 82. An X-axis stepper motor 94 (FIG. 2) is coupled to one end of the X-axis leadscrew 92, such that activation of the motor 94 produces rotation of the X-axis leadscrew 92.

The carriage 80 is formed in two tiers, one which extends above the bridge 82 and one which extends below it. The carriage 80 is comprised of a pair of columns 96 having a plate 98 extending between them. Extending normally of the plate 98, below the bridge 82, is shelf member 100. Shelf member 100 is a rectangular plate having a distal end, designated 102, and a proximal end, designated 104.

Mounted to the shelf member 100 is mount 120 which supports X-axis leadscrew nut 122. The X-axis leadscrew nut is preferably a spring-loaded, adjustable, sell-adjusting leadscrew nut. Also mounted to the shelf member 100 are a pair of v-wheels 124 mounted for rotation about their respective axes. Each v-wheel 124 has a "V" shaped groove 126 along its perimeter. The grooves are proportioned to allow the v-wheels 124 to roll along the v-rails 90 mounted to the bridge 82. When the X-axis stepper motor 94 is activated to rotate X-axis leadscrew 92, X-axis leadscrew nut 122 causes the carriage 80 to travel along leadscrew 92, with v-wheels 124 rolling along v-rails 90.

X-axis travel serves two functions. Its first function is to position the carriage 80 in alignment with the column 28 that contains the workpiece type selected by the user. Prior to an engraving operation, all clamping plates 46 are in their first position, with each receiving component 62 of each clamping plate 46 aligned along an axis parallel to the X-axis with all of the other receiving components 62. As the carriage 80 carries workpiece selector block 72 in the X-direction, slot 74 of the workpiece selector block 72 passes over tab 63 of each receiving component 62. Rotating the X-axis stepper motor 94 through a predetermined number of incremental steps in the desired direction positions slot 74 of workpiece selector block 72 into engagement with tab 63 of the receiving component 62 associated with the selected workpiece column. Activation of the workpiece positioning stepper motor 62 at this point causes movement of clamp 46 and hence movement of the workpiece into the engraving and dispensing positions as described above.

The second function of X-axis travel is to move the engraving tool in the X-direction as needed to engrave the desired text. This X-axis movement is also step-controlled and, because fine movement of the engraving tool is needed, a micro-stepping driver is used in connection with the X-axis motor.

Engraving requires movement of the engraving tool in both the X-and Y-directions. The components used for effecting Y-axis movement will next be described.

Y-Axis Travel

In FIG. 6, the tier of the carriage 80 located above the bridge 82 facilitates Y-axis travel of the engraving unit. Extending normally of the distal end 102 of shelf member 100 are a pair of vertical support members 106 (see also FIG. 7), and extending normally of proximal end 104 of the shelf member 100 are a second pair of vertical support members 108. As shown in FIG. 2, each support member 108 is secured to one of the columns 96. Extending cantilever-style from each of the vertical supports 108, above the bridge 82, is a beam member 110. The beam members are parallel to each other in the X-axis direction and are also parallel to the shelf member 100 in the Z-direction.

Beam members 110 are supported by vertical support members 106, but the beam members 110 extend beyond support members 106 in the Y-direction. Member 114 bridges the distal ends of beam members 110, such that a rectangular frame is formed by plate 98, beam members 110 and member 114.

Elongate v-rails 116 line beam members 110 at the inside of the rectangular frame. A Y-axis carriage 118 travels along these rails during Y-axis motion of the engraving tool.

A Y-axis leadscrew 130 extends through plate 98 of carriage 80 and couples with Y-axis stepper motor 132. The Y-axis carriage 118 is coupled to leadscrew 130 by means of an adjustable, self-adjusting leadscrew nut 136 (FIG. 8B) that is preferably made of turcite.

Referring to FIGS. 2 and 6–8, the Y-axis carriage 118 is a rectangular carriage having a pair of long sides 138, a proximal end 140 which is coupled to the leadscrew nut 136, and a distal end 142. V-shaped grooves 144 (FIG. 7) are formed in the long-sides 138 of the carriage 118. As shown in FIG. 8B, four v-wheels 146 are mounted to the underside of the Y-axis carriage 118. Like the X-axis v-wheels 124, each Y-axis v-wheel 146 has a groove formed along its perimeter.

These v-wheels 146 are mounted to the carriage 118 such that their grooves are substantially contiguous with the v-grooves 144 in the carriage 134. The wheels 146 roll along v-rails 116 (FIG. 2) during Y-axis movement of the carriage 118, with the v-rails 116 extending into the grooves in the v-wheels and also into the v-grooves 144 in the carriage 118. The v-rail and v-wheel design is preferred over a rounded or flat rail design because it optimizes contact between the wheel and the rail.

Y-axis travel is step controlled using a micro-stepping driver. The Y-axis carriage preferably returns to a home location and resets the counting sequence by means of a limit switch (not shown) in order to prevent error due to cumulative step loss. Step errors are also avoided in the preferred embodiment by constructing the carriage 80 and the carriage 118 using precision-machined components.

Z-Axis Control

Figure 8A:
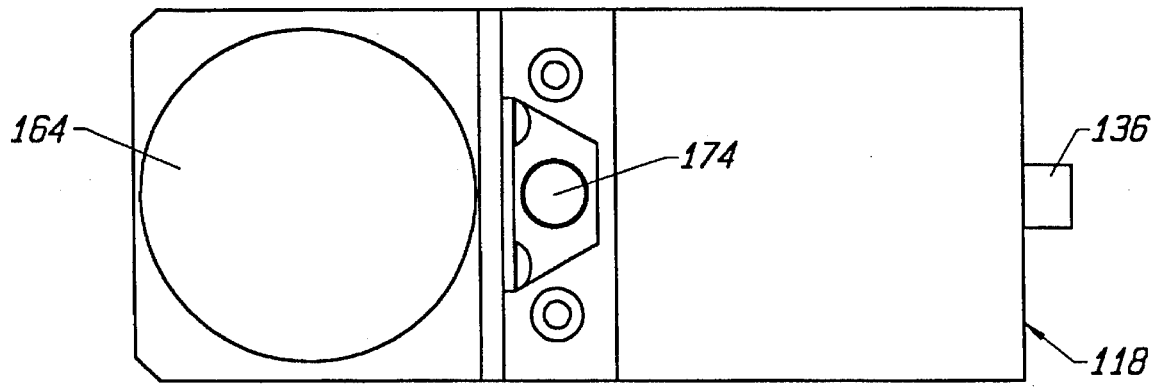
FIGS. 8A and 8B are top and bottom views, respectively of the Y-axis carriage of the present invention.
Figure 8B:
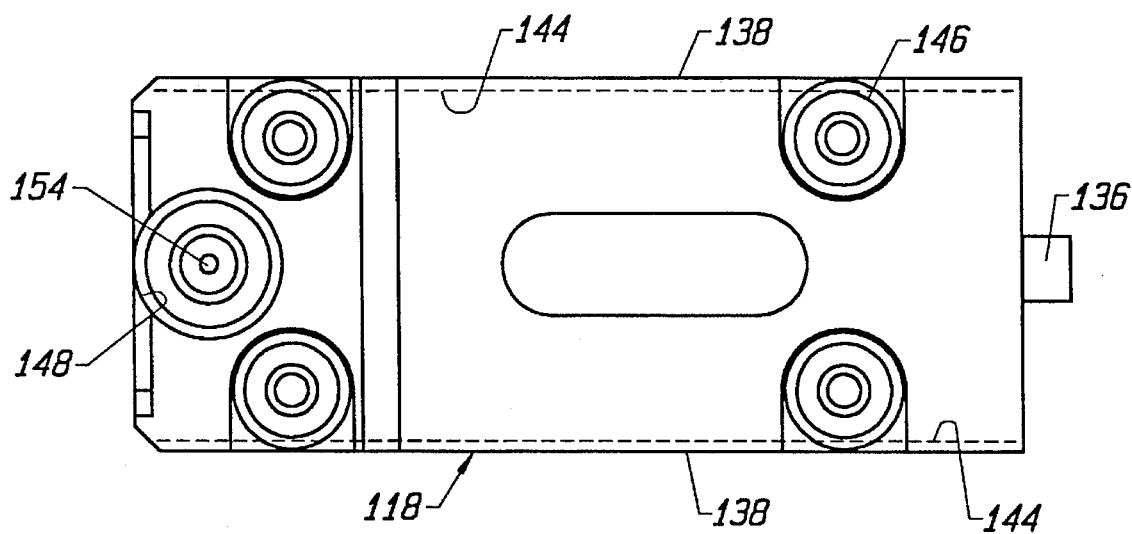
Figure 9:
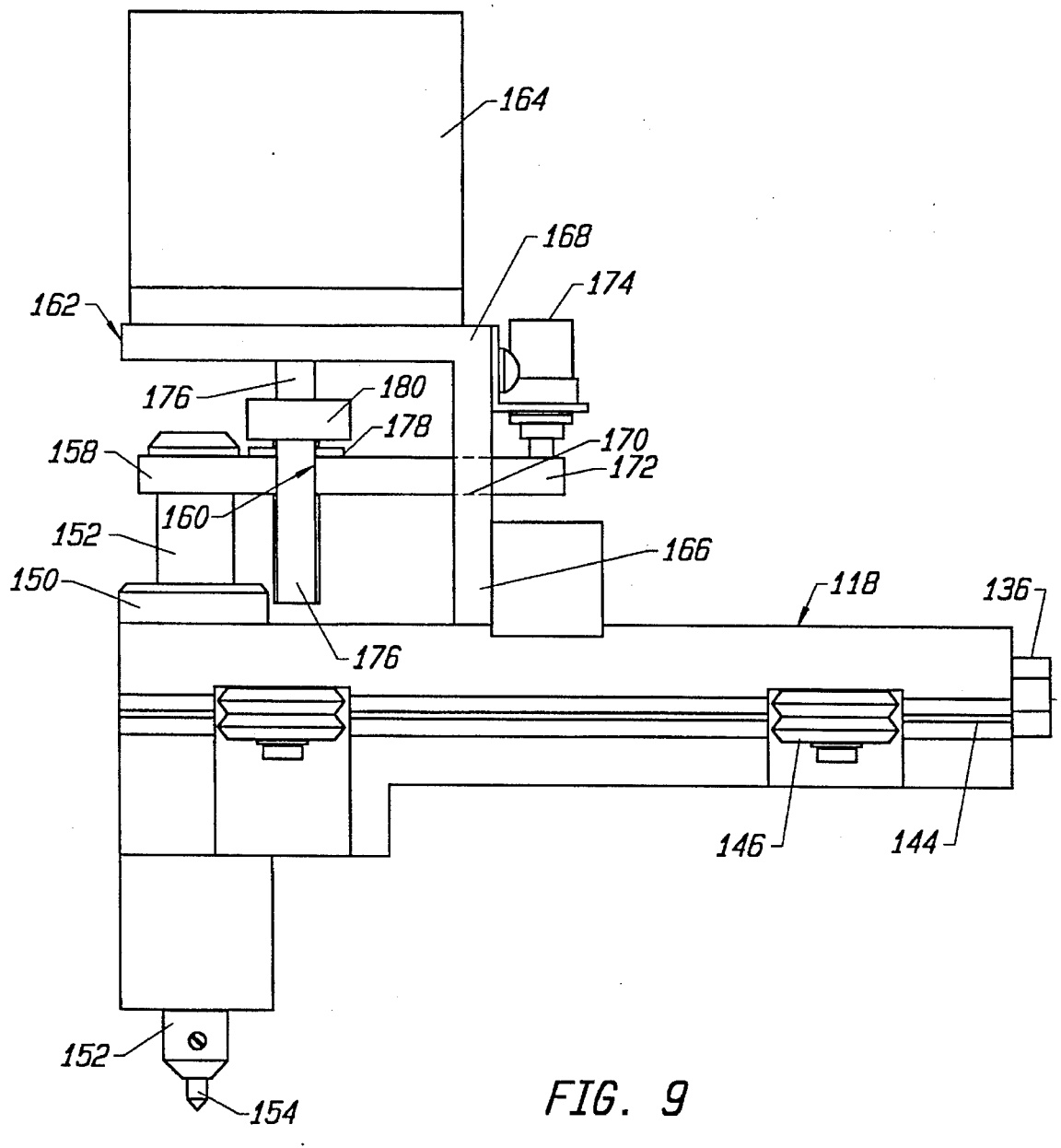
FIG. 9 is a side view of the engraving unit according to the present invention.

As shown in FIG. 8B, a bore 148 passes through the Y-axis carriage 118 in the Z-direction. Secured within bore 148 is engraving tool shaft 150 (FIGS. 7 and 9) which itself has a throughbore (not shown) extending its longitudinal length. An engraving tool 152, which supports the diamond tip 154 used for engraving, is slidably received in the throughbore in the shaft 150. The engraving tool holder is vertically biased with respect to the shaft 150 by a spring (not shown).

Mounted to the Y-axis carriage 118 is a mounting device 162 which supports Z-axis stepper motor 164. Mounting device 162 is comprised of a plate 166 extending normally of Y-axis carriage 118 and motor platform 168 which is substantially perpendicular to plate 166 and parallel to Y-axis carriage 134. A pair of rods 163 (FIG. 7) extend from the motor platform 168 in the Z-direction and are slidably received in a pair of bores 165 formed in a brass holder 158.

Plate 166 has a slot 170 for receiving a proximal portion of brass holder 158. Proximal most portion 172 of brass holder 158 passes through the slot 170 and serves as a trip for Z-axis limit switch 174 which is connected to mounting device 162.

A Z-axis leadscrew 176 is coupled to Z-axis stepper 164 and extends through motor platform 168. The end of the leadscrew 176 opposite the stepper 164 is unsecured to eliminate vibration and wear. Z-axis leadscrew nut 178 which may be non-adjustable and which is preferably made from turcite, is mounted to brass holder 158 and receives the Z-axis leadscrew 176. The leadscrew 176 is solid-coupled by coupling 180 to the Z-axis stepper motor 164.

Activation of Z-axis stepper motor 164 results in linear upward or downward motion (depending on the direction of rotation produced by the motor) of the brass holder 158 by virtue of the leadscrew nut 178. As the brass holder moves, it slides along rods 163 that are disposed within its bores 165. These rods 163 help to maintain the stability of the engraving tool.

Upward or downward movement of the brass holder 158 causes resultant upward or downward movement of the diamond tip holder 152 against the biasing spring and corresponding Z-axis movement of the diamond tip 154. The distance by which the diamond tip is moved is determined by the number or step increments traveled by the stepper motor, which is driven by a half-stepping driver (not shown). After an engraving job is complete, the engraving tool is returned to a Z-axis home position, thus triggering the limit switch 174 to reset the step counter.

Z-axis movement serves two purposes: it moves the diamond tip onto and off of the workpiece during the engraving process (e.g. to begin engraving or to lift the diamond tip when moving from one character in a word to the next); it also provides a means for adjusting the width of the strokes made on the workpiece during engraving. Thicker strokes are formed when relatively high pressure is applied to the diamond tip, while thin strokes require relatively light pressure on the diamond tip.

By spring loading the diamond tip and using a stepper driven Z-axis positioning system, the amount of diamond tip pressure can be varied within the limits of the selected spring. Spring selection becomes a function of the material selected for the workpieces to be engraved by this machine. Generally it is envisioned that any material which is amenable to diamond engraving can be engraved using the initial spring selection and some combination of pre-set spring compression (affecting the lightest setting) and Z axis stroke (affecting the strongest setting). The spring in this case is 2.0 inches in overall length with a spring rate of 8.1 pounds and a wire diameter of 0.042 inches. The outside diameter of the spring is 0.420 inches and the solid height is 0.558 inches. These characteristics provide for operating motion within an acceptable range of the spring allowing as close to linear change in force with compression as possible.

The design described above, coupled with the system software and diamond tip selection, allows each job to be programmed for specific output characteristics. In particular, diamond tip geometry, spring pressure and material hardness combine to affect actual engraved stroke width. Consequently, when jobs are laid out and material and diamond tip geometry selected, the particular stroke width can be adjusted within the job by varying Z axis position. The significance of this is that each column may have a different workpiece, each having its own font styles and stroke widths and thus its own style or look.

Accessory Dispensing Unit

As shown in FIG. 1, the preferred embodiment has two identical accessory dispensing units 18 mounted in the engraving booth. These units operate using combined concepts of gravity feed and positive dispensing using a pair of stepper motors.

Figure 10:
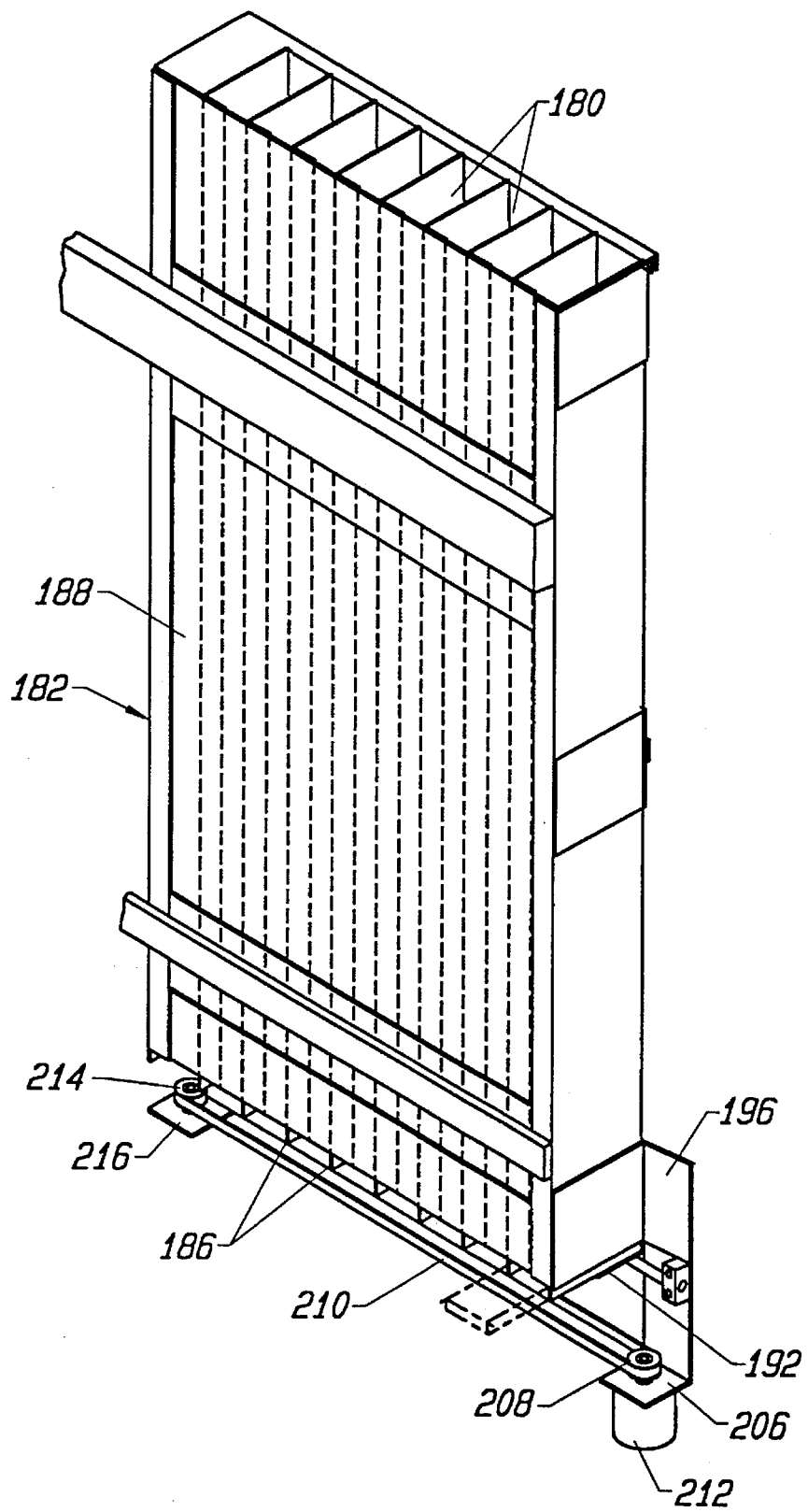
FIG. 10 is a perspective view of an accessory dispensing unit according to the present invention, showing the dispensing unit as viewed from the front.
Figure 11:
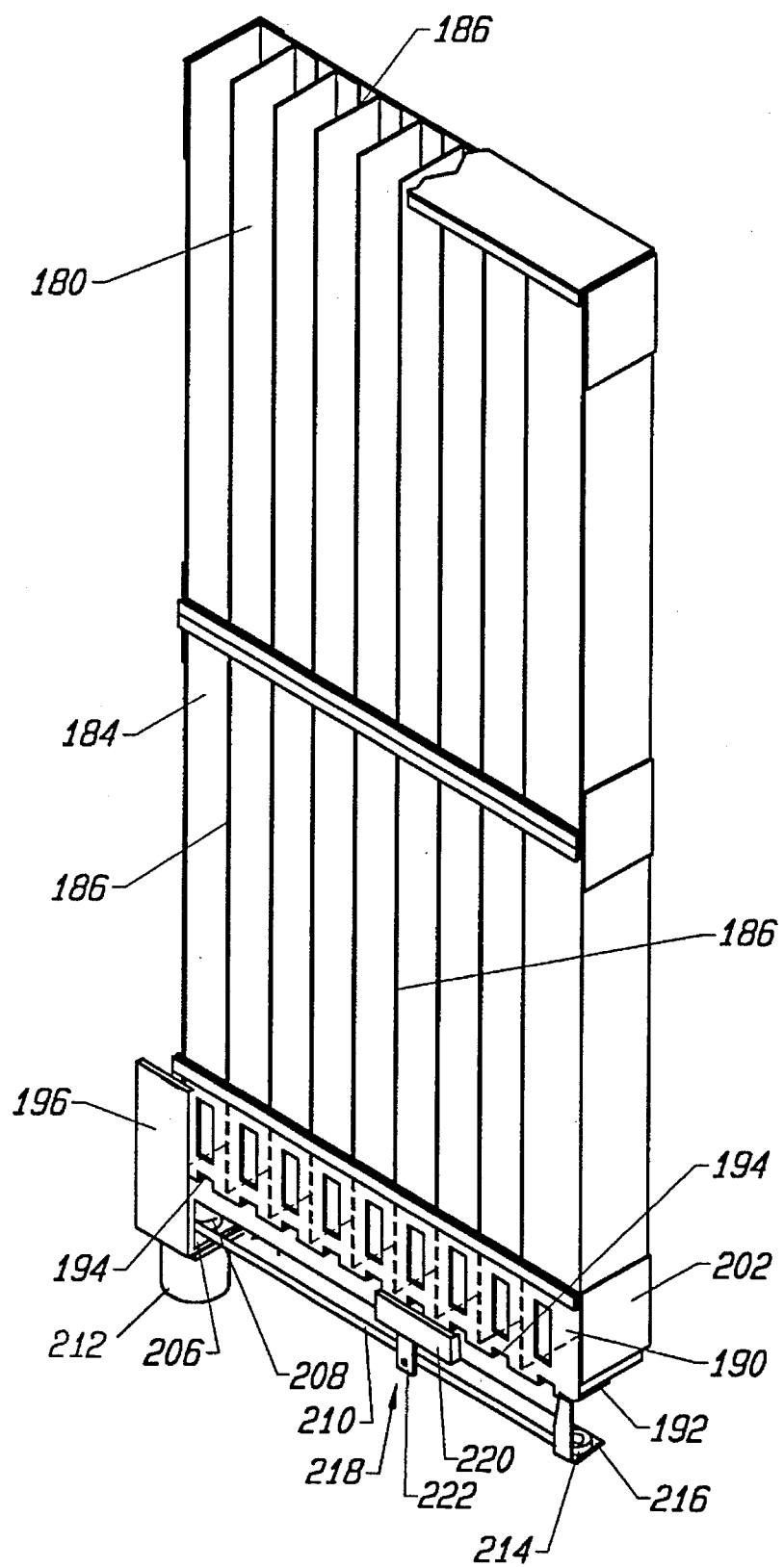
FIG. 11 is a perspective view of the accessory dispensing unit of FIG. 9 showing the dispensing unit as viewed from the back.

Referring to the dispensing unit shown in FIGS. 10 and 11, each accessory dispensing unit is comprised of a plurality of accessory storage columns 180 positioned adjacent to one another. The accessories are held in small packages, preferably rectangular boxes (not shown), and are stacked vertically within the storage columns 180. The preferred unit holds approximately 100 units per column, for a total per column weight of approximately 5 pounds.

The unit is designed such that each column can hold a different accessory type. During use, the controller instructs the dispensing unit to dispense whichever of the various accessory types corresponds to the workpiece type selected by the user.

The dispensing unit 18 has a front side designated 182 in FIG. 10, and a back side designated 184 in FIG. 11. A plurality of dividing walls 186 separate the storage columns 180. A front wall 188 covers the front side 182 of the dispensing unit, although the dividing walls 186 extend below the lower edge of the front wall 188.

Figure 12:
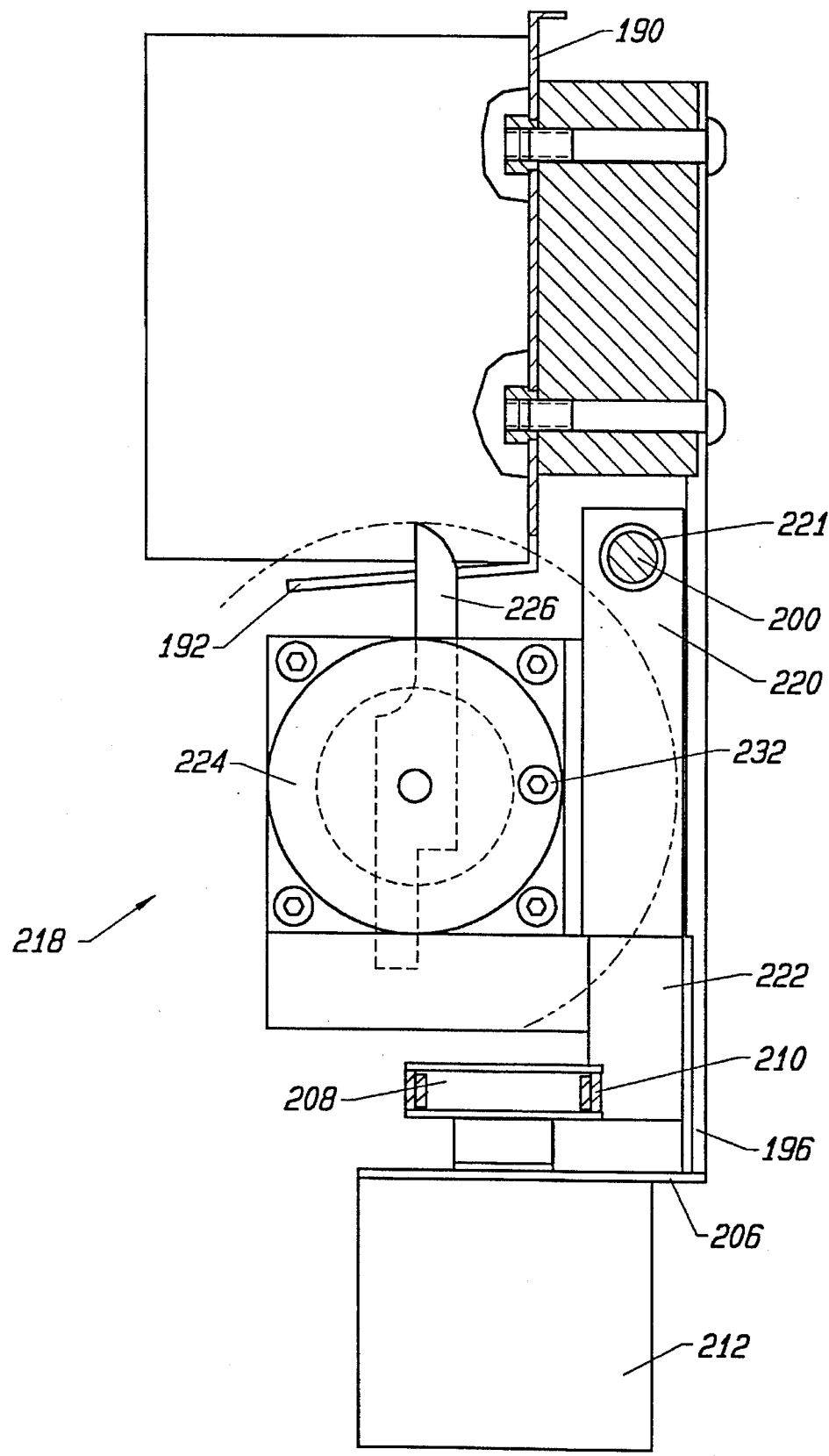
FIG. 12 is a side view of the place and pick components of the accessory dispensing unit.
Figure 13:
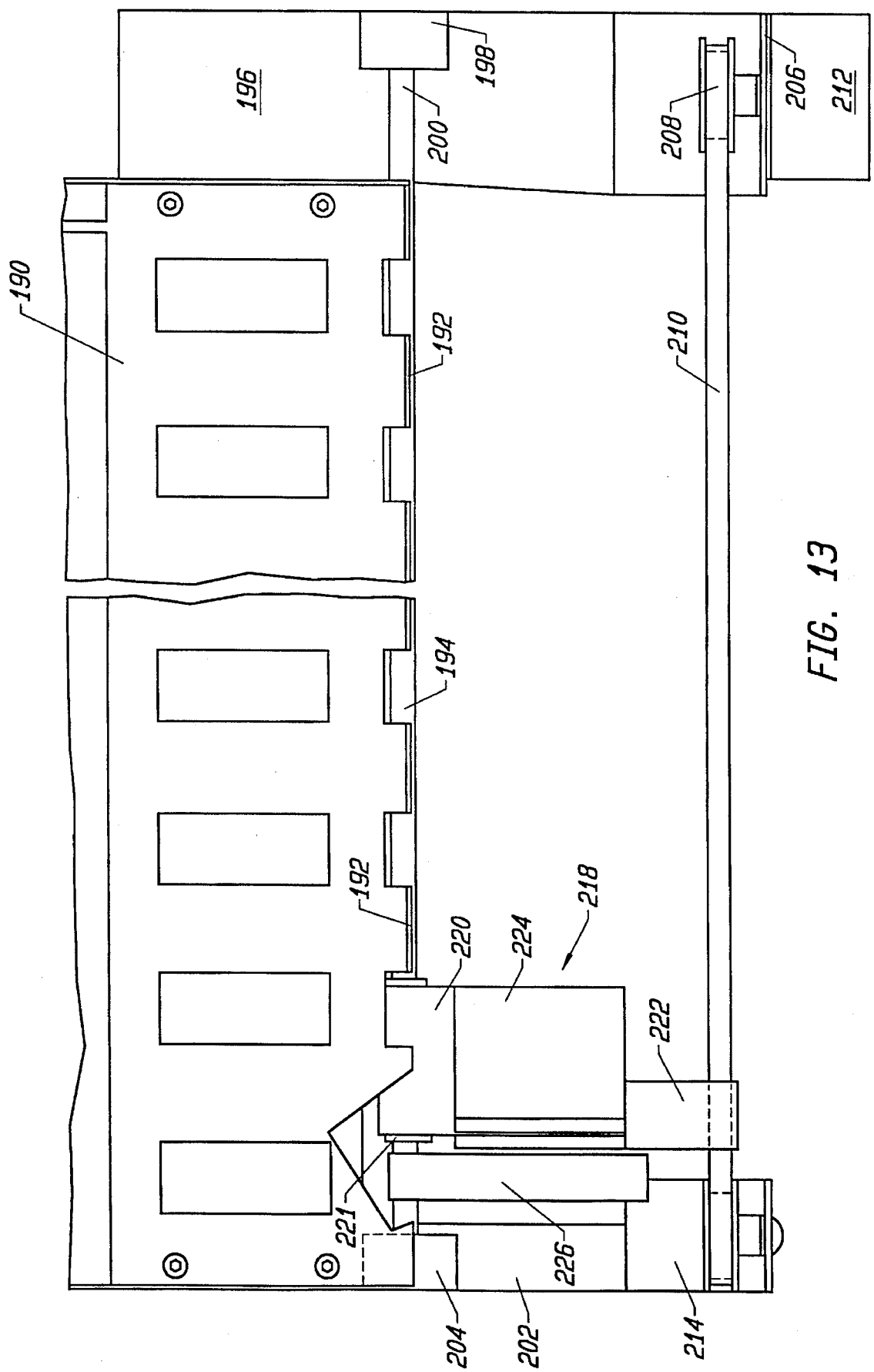
FIG. 13 is a front view of the place and pick components of the accessory dispensing unit.

A windowed plate 190 extends across the back side 184 of the dispensing unit, near the bottom. Extending from the windowed plate 190 towards the front side 182 of the dispensing unit is a bottom plate 192 (FIG. 12). The bottom plate 192 has a slight downward angle (preferably approximately 5°), and preferably has a smooth, low friction surface to facilitate the dispensing of accessory packages. An angular picking window 194 is formed in the windowed plate 190 and the bottom plate 192. The width of the picking window 194 is smaller than the width of the accessory boxes (not shown) which are placed in the storage columns 180. Thus, accessory boxes in the columns 180 are supported by base plate 192 but they are partially exposed by window 194. A viewing window 195 is also formed in plate 190 to allow the number of accessory boxes in each column to be monitored.

Figure 14:
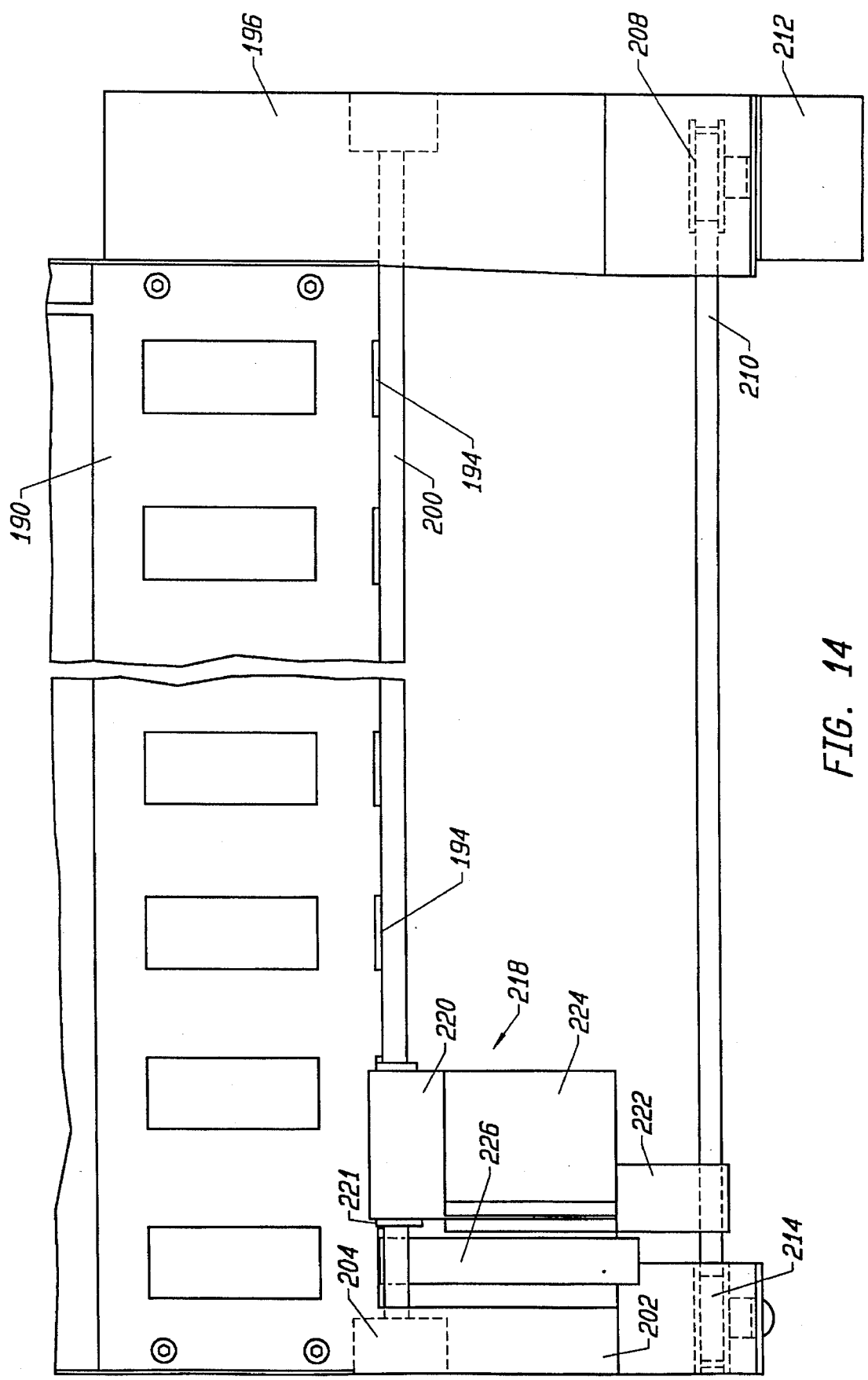
FIG. 14 is a rear view of the place and pick components of the accessory dispensing unit.

A mounting plate 196 extends laterally from the back side 184 of the dispensing unit. Secured to the mounting plate 196 is a block 198 which supports a rail 200. The rail extends behind the dispensing unit as shown in FIGS. 11 and 14 and is secured to wall 202 by block 204.

Extending normally of mounting plate 196 is plate 206. Plate 206 supports pulley 208 and place motor 212 (preferably a 3.8 amp, 1.3 V DC stepper motor) which, when activated, causes rotation of the pulley 208. A second pulley 214 is mounted to an L-shaped plate 216 that is attached to windowed plate 190. Belt 210 forms a loop which revolves around the pulleys 208, 214. Movement of the belt 210 around the pulleys 208, 214 is propelled by rotation of pulley 208 by stepper motor 212.

The picker mechanism, designated generally as 218, is movable between the columns 180 so that it can eject accessory packages from any column 180. The picker mechanism 218 is comprised of a carriage 220 slidably mounted on the rail 200 and secured to belt 210 at member 222. A bearing 221 provides a smooth surface between the carriage 220 and the rail 200 to facilitate sliding. A limit switch (not shown) is mounted to the dispensing unit at one end of the carriage travel, and a corresponding triggering device (not shown) is mounted to the carriage 220.

The carriage 220 carries a picker motor 224, which is preferably a 2.9 amp, 3.4 V DC triple stack stepper motor, that rotates a picker arm 226 when activated. The picker arm is proportioned to rotate through one of the picking windows 194, thereby pushing an accessory package out the front side 182 of the accessory dispenser. A chute 228 (FIG. 1) is formed in the engraving booth which allows the accessory package to slide to a dispensing location 230 once it has been picked by the picker arm 226 from the storage column 180.

The picker motor 224 can be software driven to affect a motion profile. This allows a wide range of accessory mass to be accommodated as well as speed of picking. In order to insure no cumulative speed loss occurs, a detente 232 is provided in the stepper motor 224 is positioned at zero degrees with enough tolerance to force or hold the unpowered picker arm 226 to a true zero position. A photoelectric limit switch may be used in place of the detente 232. This may be preferable in order to compensate for variations in stepper motor windings.

The picker arm 226 has a tapered end which helps minimize damage to the accessory package during the dispensing operation. The length of the picker ann is chosen to ensure positive dispensing by maximizing contact between the picker ann and accessory package during picker ann travel. The distance to the package, the modem arm during picker arm rotation and the required motor power must be taken into account when selecting the drive components for the picker arm.

Oftentimes an accessory contained in an accessory package will be shifted to one side of the package, causing uneven distribution of weight in the package. When package concerns are shifted towards the from side 182 of the dispenser, multiple packages may accidentally be dispensed from one column during a single picker arm rotation.

To overcome this problem, a rear weighted block (not shown) may be placed on top of the stack of accessory packages in each column. The preferred weight block is 0.5 pounds; it is rear weighted to insure that the packages remain horizontal regardless of the number of packages remaining in the column or the location of the center of mass of each package. This effectively prevents multiple packages from being "picked" from a column in weight-forward conditions.

The weight block is designed such that if a transaction is attempted when only the weight block is left in the column (i.e. because of an inventory mis-count), the picker arm will neither eject the weight block nor collide with it. This is accomplished by slotting the rear of the weight block such that the picker arm misses it entirely and shaping the block such that it cannot inadvertently pass through the picking window 194 opening on the opposite side of the dispenser base.

The place motor 212 and the pick motor 224 are operated using half-stepping drivers. To prevent cumulative step loss error, the step counting sequences are re-set between dispensing jobs.

User Interface and Control

Figure 15:
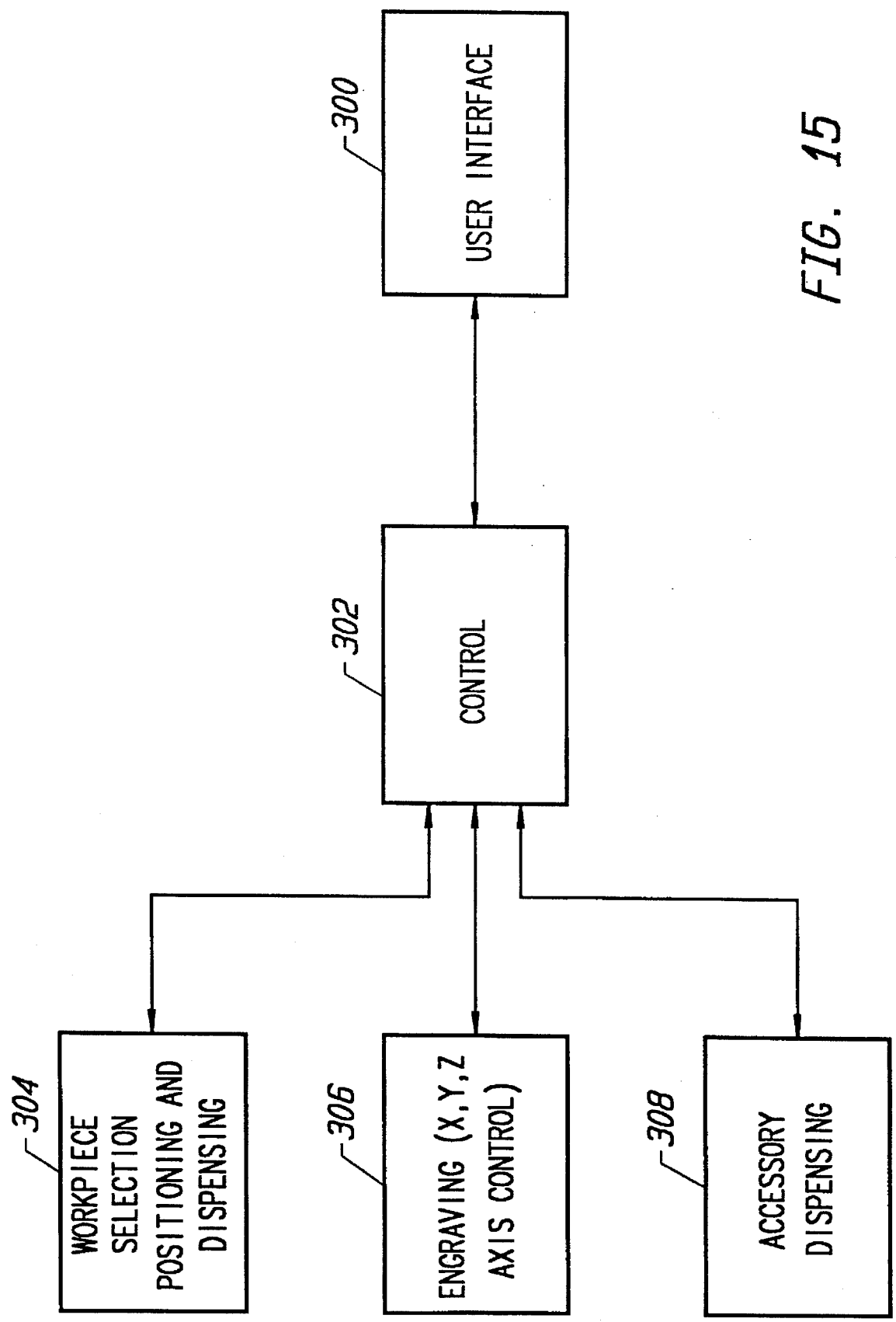
FIG. 15 is a simplified block diagram showing the system of the present invention.

The method and apparatus of the present invention is directed to the control of an engraving system, including the selection of the workpiece, positioning of the workpiece in an engraving location, engraving, and dispensing the workpiece along with the appropriate accessory for the workpiece type. A simplified schematic representation of the present system is shown in FIG. 15. A user interface 300, which is preferably a personal computer ("PC") prompts for and processes data supplied by a user and passes the processed data to a controller 302. The controller 302 converts the data to drive signals which control operation of the workpiece handling unit 304, the engraving unit 306, and the accessory dispensing unit 308. When necessary, the controller also delivers error signals to the user interface which then result in the termination of a job.

Figure 16:
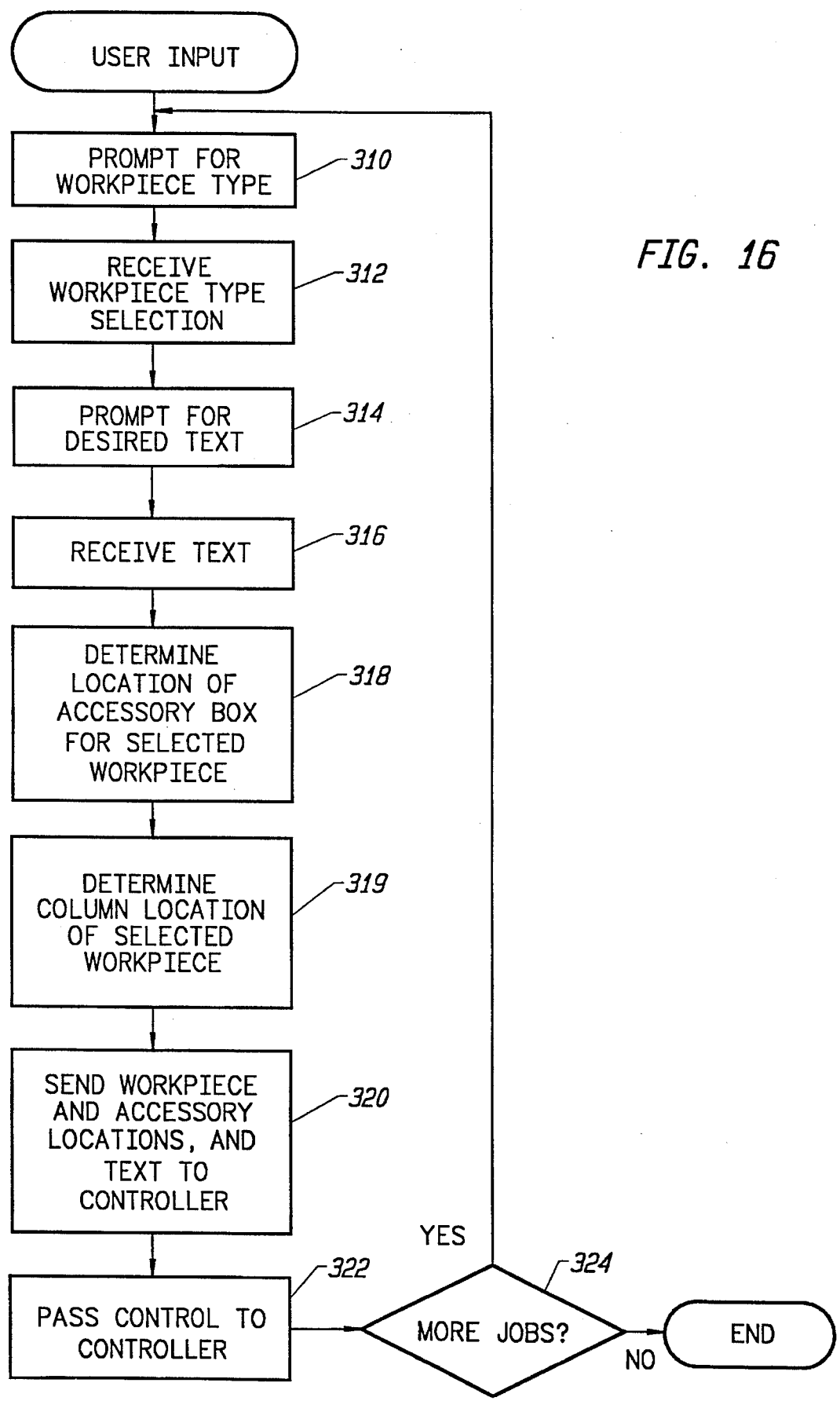
FIG. 16 is a simplified flow diagram showing the functions of the front end computer of the present invention.

A simplified flow diagram showing the function of the user interface 300 is shown in FIG. 16. First, at step 310, the user is prompted to select a workpiece type. For example, the user may be prompted to chose between a pet tag, medical bracelet, luggage tag, etc. In the preferred embodiment, the prompt appears on a video screen equipped with a video touch screen and prompts the user to touch the area of the screen designating the chosen workpiece.

After the workpiece type selection is entered, step 312, the user interface terminal prompts the user to enter the text to be engraved onto the selected workpiece, step 314. At step 316, the user inputs the text using the touch screen or other input device.

The user may also be prompted for additional information, such as font type or payment information (e.g., credit card information). If the system is equipped to take and process (see payment card slot 23 and receipt printer 21 at FIG. 1) credit or debit card information, the PC also performs credit verification procedures with the assistance of a modem and communication software.

The preferred embodiment is also equipped to communicate with an off-site central registry which, using a serial number engraved on the workpiece, maintains records relevant to the workpiece type. For example, when a pet tag is purchased, the purchaser is prompted for the name and address of rite pet owner. A serial number is engraved on the tag, and the information about the owner is stored at the central registry under that serial number. Should the pet become lost, a finder of the pet will be able to contact the pet owner through the central registry. The information to be maintained at the central registry is normally stored temporarily in the PC installed in each engraving unit. A computer at the central registry periodically polls each engraving unit tied into the registry network to retrieve information obtained by the individual engraving units during recent transactions.

Once the necessary input has been received from the user, the PC retrieves from its memory the column location for the accessory which is to be distributed with the engraved workpiece, and the column location for the selected workpiece, steps 318–319. At step 320, the column locations for the accessory box and workpiece and also the text to be engraved onto the workpiece are transferred to the controller in the form of a data string. Job information, specifying the selected workpiece type, is also passed to the controller at step 320 to allow the controller to retrieve formatting information from its memory. Control for the job is passed to the controller at step 322.

The PC, via the video screen, next asks the user whether additional engraved workpieces are desired, step 324. If additional jobs are requested by the user, the PC again prompts the user for workpiece type, step 310, etc.

Figure 17:
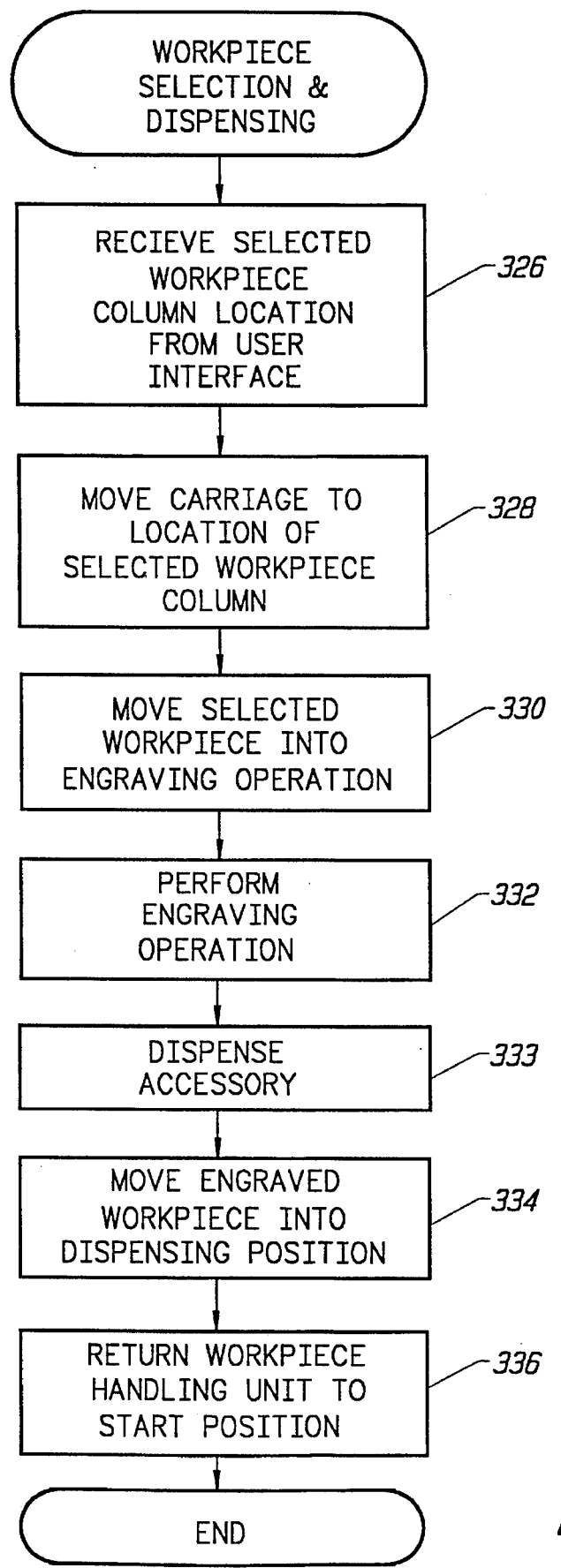
FIG. 17 is a simplified flow diagram showing the functions of the controller in workpiece selection and dispensing.

Upon receiving control from the PC, step 322, the controller begins the workpiece selection step of the process. Referring to FIG. 17, the controller first extracts the column location for the selected workpiece from the data string supplied by the PC, step 326. Next, at step 328, the controller activates the X-axis stepper motor (designated 94 in FIG. 2) such that the carriage 80 travels along the X-axis until it reaches the designated column location. At this point the workpiece selector block 72 will be engaged with the receiving component 62 associated with the column containing the selected workpiece (see FIGS. A and 4).

At step 330, the selected workpiece is moved into the engraving location. During this step, the controller instructs workpiece positioning stepper 66 to move through the appropriate number of steps to move the workpiece already captured in the clamping plate 46 to the engraving location (i.e. on top of the rollers 56). The engraving operation is next performed, step 332, using X-, Y-, Z-axis movement of the engraving tool as will be described below.

Figures 18, 19:
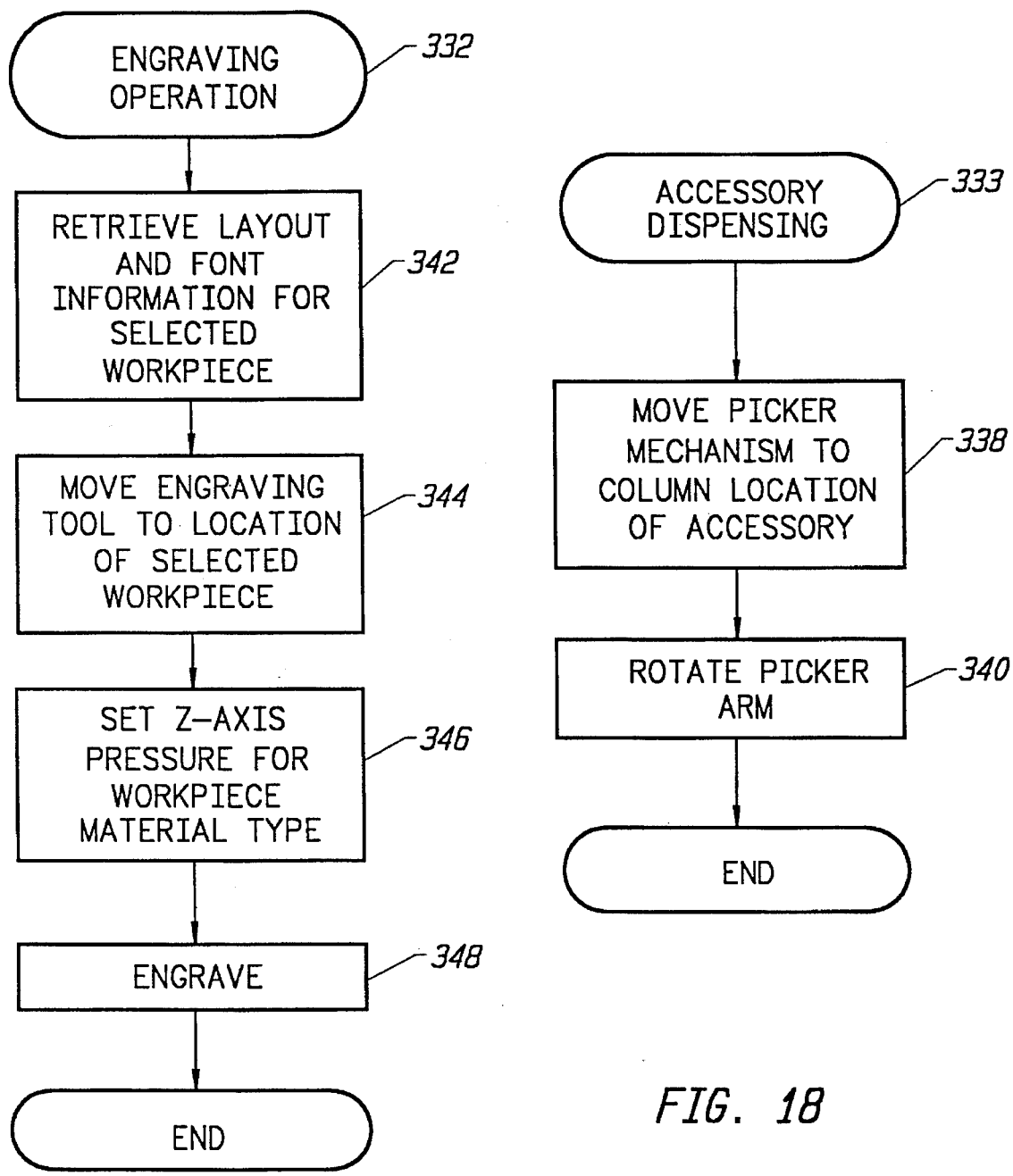
FIG. 18 is a simplified flow diagram showing the functions of the controller in accessory dispensing.
FIG. 19 is a simplified flow diagram showing the functions of the controller in the managing of the engraving operation.

After engraving is complete but before the workpiece is dispensed at step 344, the accessory corresponding to the selected workpiece is dispensed, step 333. Referring to FIG. 18, during the accessory dispensing operation the controller activates the place motor 212 and causes it to travel until the picker arm 226 is in alignment with the column location provided to the controller by the PC. After the place motor 212 is turned off, picker motor 224 is activated to rotate picker arm 226, causing it to knock an accessory package from the column 180.

Returning to FIG. 17, once the accessory is dispensed, the workpiece is ejected from the workpiece handling unit 14, step 334. During this step, the controller activates the workpiece positioning stepper motor 66 to move the clamping plate 46 into the workpiece dispensing location such that the workpiece falls from the clamping plate 46 and into a dispensing chute. At this point, Z-axis movement is also initiated to move the engraving tool to the workpiece dispensing location. This ensures that the workpiece drops from the clamping plate by pressing the workpiece out of the clamping plate if it has not already fallen from it. Finally, the workpiece positioning unit 14 is returned to the workpiece capturing position, step 336.

The engraving operation will next be described with reference to FIG. 19. Using the workpiece type information received from the PC, the controller next retrieves the layout and font information for that selected workpiece, step 342. In the preferred embodiment, this information is predetermined for each workpiece type and stored in the controller. A table showing an example of the arrangement and selection of variables for the controller is shown below:

| workpiece type | Z-axis pressure | layout |
|---|---|---|
| luggage tag | 3–4 lbs | 4 lines, single font |
| pet tag | 4 lbs | 3 lines, single font |
| medical tag | 2½ lbs | 4 lines, multiple fonts |

However, the font may be chosen by the user and the layout may be calculated using the number of the letters in the desired text, the size of the workpiece, the size of the font, and other predetermined values such as the percentage of white space and the length of each line. An engraving system performing calculations of this type is described in U.S. Pat. No. 4,437,150 to Dahlgren et al., which is incorporated herein by reference.

At step 344, the controller instructs X-and Y-axis movement of the engraving tool to the position on the selected workpiece where engraving will begin. At this point in the process, the engraving tool will already be close to the X-axis position necessary to begin the engraving process. This is because the carriage 80 which carries both the engraving tool and the workpiece positioning unit 14 will have already moved into alignment with the column containing the selected workpiece during the step of delivering the selected workpiece to the engraving position (FIG. 17, steps 328 and 330). However, the X-axis position of the engraving tool is fine-tuned in step 344 to position the engraving tool for engraving. Y-axis movement of the Y-axis carriage 118 is likewise needed during step 344 to place the engraving tool in the proper starting position.

At step 346, the Z-axis pressure for the selected workpiece is set by the controller. The Z-axis pressure is predetermined and stored in the controller, although it also may be calculated by the PC or controller if font size is to be calculated by the system rather than predetermined for each workpiece. The Z-axis pressure is set by activating the Z-axis stepper 164 to lower (if pressure is to be increased to provide a greater stroke width) or raise (to decrease is Z-axis pressure and stroke width) the engraving tool to the position predetermined for the desired stroke width. Finally, in step 348, the text is engraved onto the workpiece. Engraving is carried out by starting and stopping the X-axis, Y-axis, and Z-axis stepper motors as necessary to move the engraving tool to engrave the letters of the desired text onto the workpiece. A method of combining X-and Y-axis movement in order to engrave characters onto a workpiece is described in detail in U.S. Pat. No. 4,437,150 and is incorporated herein by reference.

If additional jobs have been sent to the controller by the PC, the controller next begins with workpiece selection, positioning, and dispensing (FIG. 15, step 304 and FIG. 17) of the next selected workpiece.

While one embodiment of the present invention have been described, many others are possible within the scope of the invention. The scope of the invention is not intended to be limited to the specific embodiment described above, but is limited only in terms of the appended claims.

We claim:

1. An automated engraving system for engraving user designated indicia upon a user selected workpiece comprising:

user interface means for prompting the user to select a workpiece from a group of possible workpieces and to supply information about indicia to be engraved on the workpiece, and for identifying a location of a workpiece selected by the user and providing the user supplied indicia information;

control means responsive to the supplied indicia information and the identified location of the selected workpiece for generating workpiece handling control signals and engraving control signals;

workpiece handling means responsive to the workpiece handling control signals for retrieving the user selected workpiece and placing it in an engraving position in preparation for an engraving operation; and engraving means for engraving a work piece which is located in the engraving position in accordance with the engraving control signals.

2. The automated engraving system of claim 1 wherein the workpiece handling means is further for delivering the workpiece to the user upon completion of the engraving operation.

3. An automated engraving system in which a workpiece is engraved in accordance with data supplied by a user, the user-supplied data indicating a selected type of workpiece and indicia to be engraved on the workpiece, comprising:

control means for receiving the data supplied by the user, for generating formatting instructions, workpiece handling instructions, and engraving instructions corresponding to the user-supplied data, and for converting said instructions into control signals;

retrieving means responsive to control signals generated by the control means, for retrieving a workpiece of the selected type from its respective storage location and for moving the workpiece to an engraving position;

clamping means for clamping the workpiece in the engraving position; and engraving means responsive to control signals generated by the control means for engraving the designated indicia onto the workpiece.

4. The automated engraving system of claim 3 further comprising a workpiece storage chamber, each of the storage locations being within the workpiece storage chamber.

5. The engraving system of claim 4 wherein the workpiece storage chamber comprises:

a plurality of workpiece columns, each having a workpiece delivery location; and delivery means for delivery and biasing a workpiece from each column into its respective delivery location.

6. The engraving system of claim 5 wherein:

each workpiece column houses a stack of workpieces; and the delivery means comprises a plurality of partially compressed springs, each positioned inside one of the workpiece columns to apply force against the associated stack of workpieces.

7. The engraving system of claim 5 wherein:

the retrieving means comprises a plurality of plates each having an opening, each plate positionable with its opening in registration with the delivery location of its associated column and further positionable to an engraving position.

8. The engraving system of claim 7 wherein each workpiece has a shape and wherein each column has a throughbore having a shape similar to the shape of its associated workpiece type.

9. The engraving system of claim 7 wherein each workpiece type has a shape and wherein the clamping means comprises:

a relief formed around the opening in each plate, the relief facing its associated column and having a shape corresponding to the shape of its associated workpiece type, the relief further having a diameter that is smaller than that of the associated workpiece type, a roller mounted to each workpiece column for rolling engagement with the corresponding plate, the roller biased towards the plate and positioned for abutment with a workpiece when a workpiece is situated in the relief and the plate has been positioned to the engraving position.

10. The engraving system of claim 1 further comprising workpiece dispensing means for dispensing the workpiece to the user after it has been engraved.

11. The engraving system of claim 1 wherein the control means is further for generating accessory dispensing instructions and converting said instructions into accessory dispensing control signals, and wherein the apparatus further comprises:

accessory dispensing means responsive to the accessory dispensing control signals, for dispensing an accessory of a type pre-associated with the workpiece type selected by the user.

12. An apparatus for dispensing an object, comprising:

a plurality of object storage columns;

a carriage positionable adjacent to each of the storage columns;

a first motor for moving the carriage;

a picking arm mounted to the carriage, the picking arm rotatable when positioned in alignment with one of the storage columns to release an object stored in the column into a dispensing location, and a second motor which carries the picking arm and which is carried by the carriage for rotating the picking arm.

13. An apparatus for handling an object, comprising:

an object storage column having an object feeding location;

a partially compressed spring positioned inside the object storage column to apply force against the object and to feed and bias the object from the column into the feeding location;

a plate having an opening and positionable with its opening in registration with the feeding location of the column and further positionable to a work position, the plate further having a relief formed around the opening, the relief facing the column and having a shape corresponding to the shape of the object and having a diameter that is smaller than that of the object; and biasing means for biasing the object against the relief when the object is situated in the relief and the plate has been positioned to the work position.

14. An apparatus for manipulating an engraving tool to engrave a workpiece, comprising:

an engraving tool;

first manipulating means for manipulating the tool in an X direction and a Y direction; and a motor for incrementally manipulating the tool in a Z direction to raise and lower the engraving tip from a surface of the workpiece and to adjust pressure between the engraving tip and the workpiece when the engraving tip and workpiece are in contact with one another.

15. An apparatus for manipulating an engraving tool to engrave a workpiece, comprising:

an engraving tool;

first manipulating means for manipulating the tool in an X direction and a Y direction; and second manipulating means for manipulating the tool in a Z direction to raise and lower the engraving tip from a surface of the workpiece and to adjust pressure on the engraving tip, the second manipulating means including a spring biased stepper motor for urging the tool against the workpiece.

16. A method of controlling an engraving system of the type having a workpiece storage unit, an automated workpiece handling system for moving a selected workpiece from the workpiece storage unit, securing it in an engraving location during engraving, and an engraving tool for engraving the selected workpiece, the control system comprising:

(a) receiving user instructions from a user, the user instructions specifying a selected workpiece type and the indicia to be engraved onto a workpiece;

(b) generating engraving instructions corresponding to the indicia in the user instructions;

(c) converting the engraving instructions into engraving control signals;

(d) generating workpiece retrieval instructions corresponding to a position containing the selected workpiece type in the workpiece storage device of the workpiece type specified by the user;

(d) converting the workpiece retrieval instructions to workpiece retrieval control signals;

(e) transferring the workpiece retrieval control signals to the workpiece handling system;

(f) moving a selected workpiece from the workpiece storage location to an engraving location in response to the workpiece retrieval control signals;

(g) transferring the engraving control signals to an engraving system;

(f) engraving a surface of the selected workpiece in accordance with the engraving control signals to produce an engraved workpiece.

17. The method of claim 16 wherein the engraving system further comprising the steps of:

(g) generating workpiece dispensing instructions;

(h) converting the workpiece dispensing instructions to workpiece dispensing control signals;

(i) transferring the workpiece dispensing control signals to the workpiece handling system; and (j) after step (f), dispensing the engraved workpiece.

18. The method of claim 17 wherein the engraving system is further of the type having an accessory dispensing unit which dispenses an accessory corresponding to the selected workpiece type, the method further comprising the steps of:

generating accessory dispensing instructions identifying a location of an appropriate accessory in the accessory dispensing unit;

converting the accessory dispensing instructions to workpiece dispensing control signals;

transferring the accessory dispensing control signals to the workpiece handling system; and dispensing the appropriate accessory.

19. The method of claim 16 wherein step (b) comprises the steps of generating font instructions for the selected workpiece type and user-supplied indicia; and generating formatting instructions for the selected workpiece type and user-supplied indicia.

20. The method of claim 19 wherein the step of generating font instructions includes the step of generating engraving tool pressure instructions.

21. An automated engraving system in which a workpiece is engraved in accordance with data supplied by a user, the user-supplied data indicating indicia to be engraved on the workpiece, comprising:

control means responsive to the supplied indicia information for generating workpiece handling control signals and engraving control signals;

workpiece handling means responsive to the workpiece handling control signals for retrieving a workpiece and placing it in an engraving position in preparation for an engraving operation; and engraving means for engraving a work piece which is located in the engraving position in accordance with the engraving control signals.

22. The system of claim 21 wherein the user-supplied data further indicates a selected type of workpiece and wherein:

the control means is further responsive to the supplied workpiece type information for generating the workpiece handling control signals and the engraving control signals.

23. The engraving system of claim 1 wherein the engraving means comprises:

an engraving tool having an engraving tip;

first manipulating means for manipulating the tool in an X direction and a Y direction; and second manipulating means for manipulating the tool in a Z direction to raise and lower the engraving tip from a surface of a workpiece in the engraving position and to adjust pressure on the engraving tip.

* * * * *